(12) United States Patent
Weng et al.

(10) Patent No.: US 11,754,780 B2
(45) Date of Patent: Sep. 12, 2023

(54) SEMICONDUCTOR PACKAGE AND MANUFACTURING METHOD THEREOF

(71) Applicant: Taiwan Semiconductor Manufacturing Company, Ltd., Hsinchu (TW)

(72) Inventors: Chung-Ming Weng, Hsinchu (TW); Hua-Kuei Lin, Hsinchu (TW); Chen-Hua Yu, Hsinchu (TW); Chung-Shi Liu, Hsinchu (TW); Hao-Yi Tsai, Hsinchu (TW); Cheng-Chieh Hsieh, Tainan (TW); Hung-Yi Kuo, Taipei (TW); Tsung-Yuan Yu, Taipei (TW); Che-Hsiang Hsu, Hsinchu (TW); Chewn-Pu Jou, Hsinchu (TW); Cheng-Tse Tang, Hsinchu (TW)

(73) Assignee: Taiwan Semiconductor Manufacturing Company, Ltd., Hsinchu (TW)

(*) Notice: Subject to any disclaimer, the term of this patent is extended or adjusted under 35 U.S.C. 154(b) by 202 days.

(21) Appl. No.: 17/319,102

(22) Filed: May 13, 2021

(65) Prior Publication Data
US 2022/0365273 A1  Nov. 17, 2022

(51) Int. Cl.
*G02B 6/12* (2006.01)
*G02B 6/42* (2006.01)

(52) U.S. Cl.
CPC ............ *G02B 6/12* (2013.01); *G02B 6/4201* (2013.01); *G02B 2006/12061* (2013.01)

(58) Field of Classification Search
None
See application file for complete search history.

(56) References Cited

U.S. PATENT DOCUMENTS

| | | | | |
|---|---|---|---|---|
| 10,234,644 | B1* | 3/2019 | Butler | G02B 6/02395 |
| 10,288,812 | B1* | 5/2019 | Evans | G02B 6/30 |
| 10,962,713 | B2* | 3/2021 | Lee | G02B 6/305 |
| 11,163,115 | B1* | 11/2021 | Gehl | G02B 6/12004 |
| 11,204,466 | B2* | 12/2021 | Butler | G02B 6/3652 |
| 2002/0187432 | A1* | 12/2002 | Dawes | G02B 6/12028 385/98 |
| 2004/0129935 | A1* | 7/2004 | Blauvelt | G02B 6/4204 257/E31.127 |
| 2007/0025663 | A1* | 2/2007 | Kuroda | G02B 6/3636 385/49 |
| 2008/0199129 | A1* | 8/2008 | Akahoshi | G02B 6/3596 385/16 |
| 2016/0131842 | A1* | 5/2016 | Mahgerefteh | G02B 6/1221 385/11 |
| 2018/0172905 | A1* | 6/2018 | Fortusini | G02B 6/4214 |

* cited by examiner

Primary Examiner — Jerry Rahll
(74) Attorney, Agent, or Firm — JCIPRNET

(57) ABSTRACT

Disclosed are semiconductor packages and manufacturing method of the semiconductor packages. In one embodiment, a semiconductor package includes a substrate, a first waveguide, a semiconductor die, and an adhesive layer. The first waveguide is disposed on the substrate. The semiconductor die is disposed on the substrate and includes a second waveguide aligned with the first waveguide. The adhesive layer is disposed between the first waveguide and the second waveguide.

20 Claims, 27 Drawing Sheets

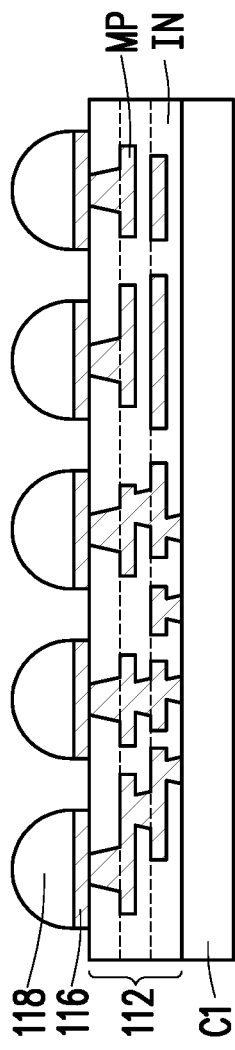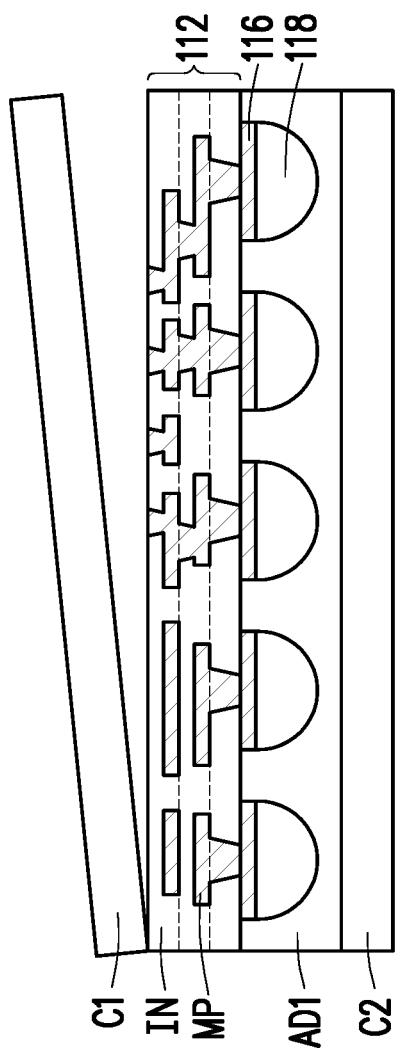
FIG. 11A
FIG. 11B

SEMICONDUCTOR PACKAGE AND MANUFACTURING METHOD THEREOF

BACKGROUND

The semiconductor industry has experienced rapid growth due to continuous improvements in the integration density of a variety of circuit components (e.g., transistors, diodes, resistors, capacitors, etc.). For the most part, this improvement in integration density has come from repeated reductions in minimum feature size, which allows more components to be integrated into a given area. Currently, System-on-Integrated-Circuit (SoIC) components are becoming increasingly popular for their multi-functions and compactness.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 11A to FIG. 11I schematically illustrate cross-sectional views of a manufacturing process of the semiconductor package in FIG. 10.

DETAILED DESCRIPTION

Figure 1A:
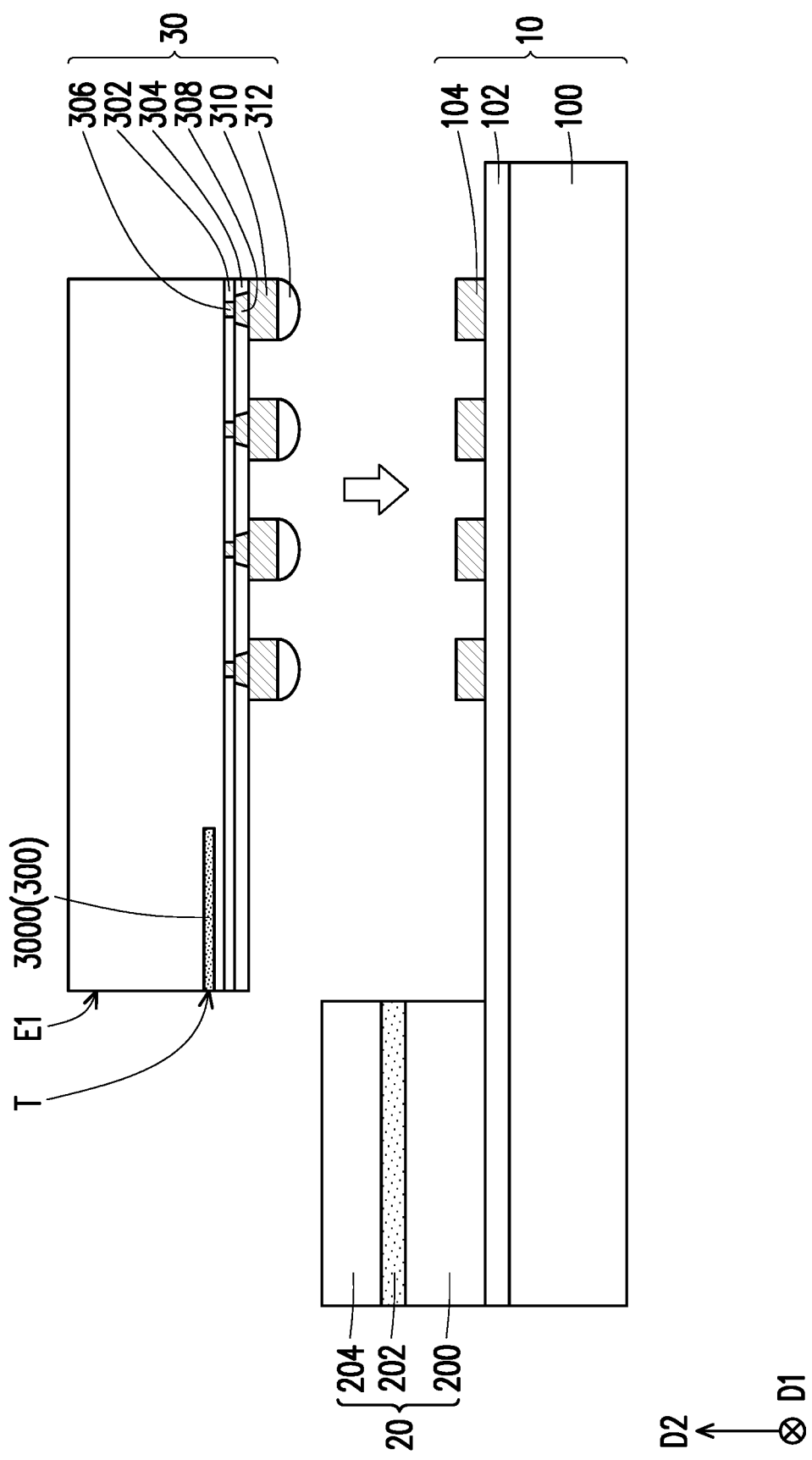
FIG. 1A and FIG. 1B schematically illustrate cross-sectional views of a manufacturing process of a semiconductor package in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, it will be understood that when an element is referred to as being "connected to" or "coupled to" another element, it may be directly connected to or coupled to the other element, or one or more intervening elements may be present. Further, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments will be described with respect to embodiments in a specific context, namely a package and a method of forming the same. Various embodiments presented herein describe formation of a semiconductor package used in photonics applications. Various embodiments presented herein allow for a cost competitive photonics semiconductor package with bandwidth scalability and relaxed accuracy requirement for optical fiber assembly.

Figure 1B:
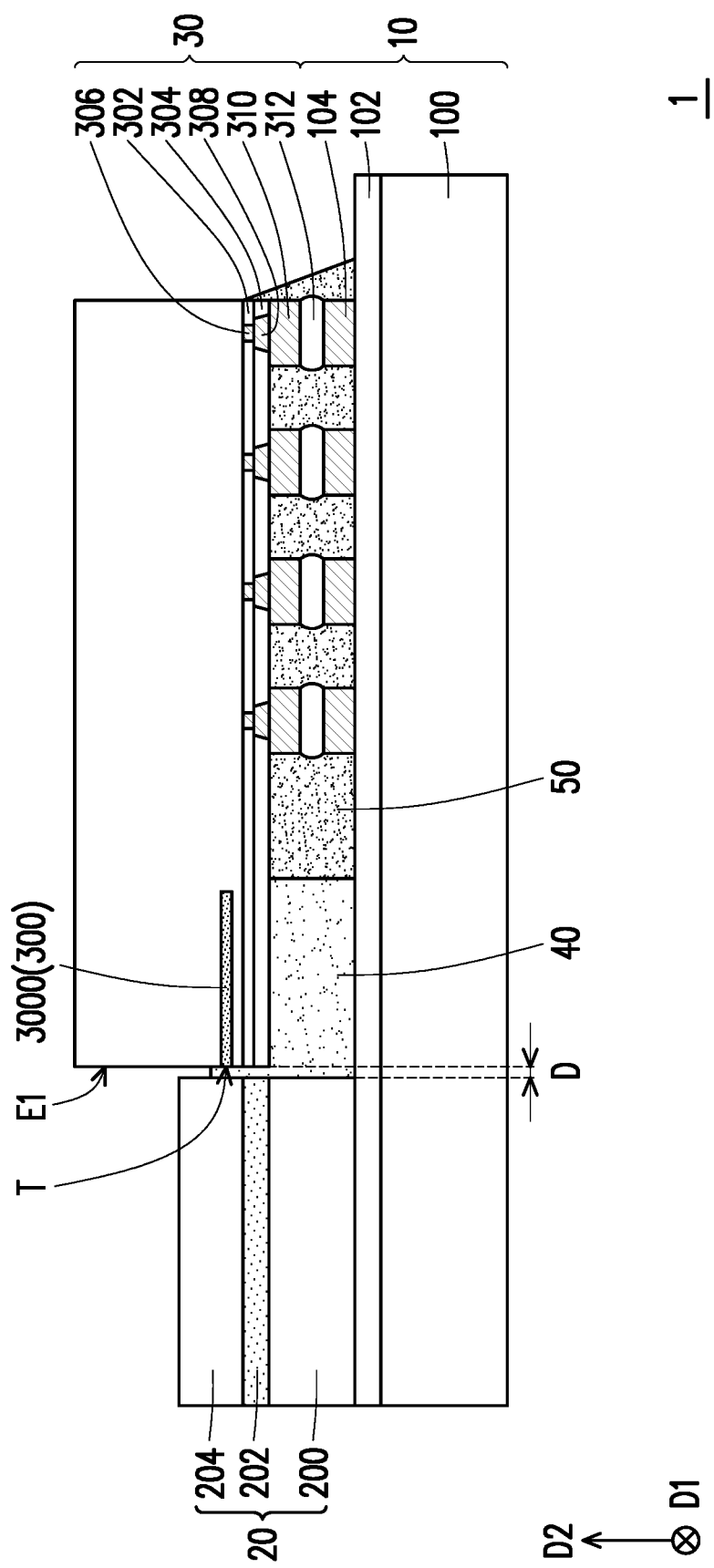
Figure 2:
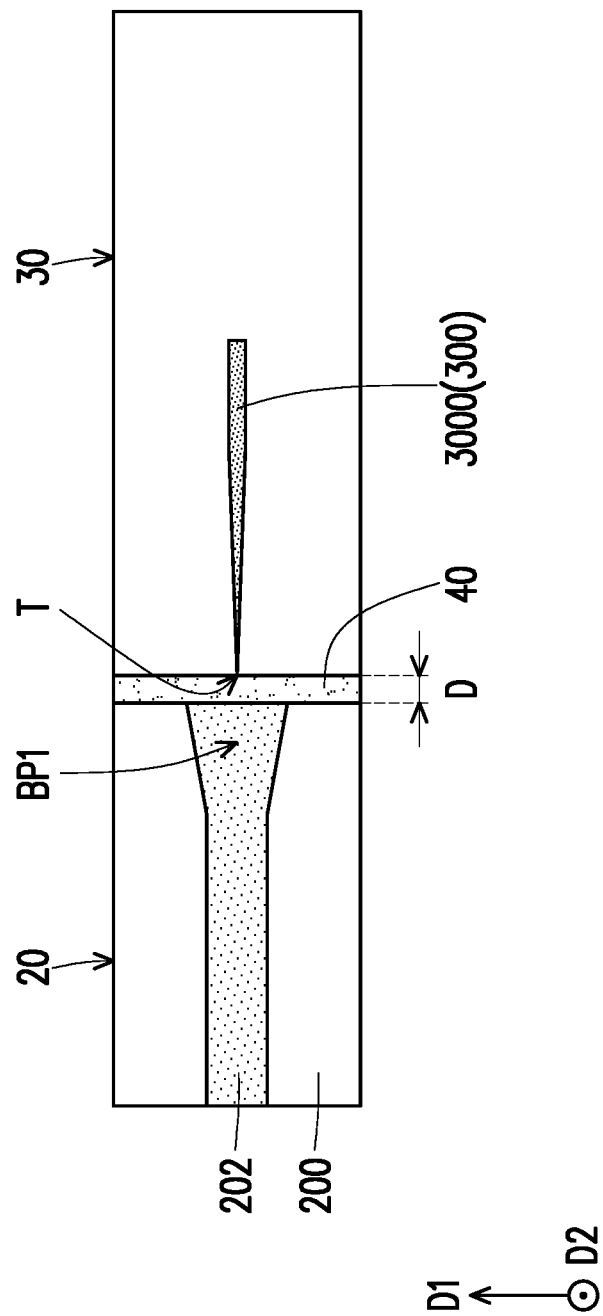
FIG. 2 schematically illustrates a partial top view of the semiconductor package in FIG. 1B.

FIG. 1A and FIG. 1B schematically illustrate cross-sectional views of a manufacturing process of a semiconductor package 1 in accordance with some embodiments of the present disclosure. FIG. 2 schematically illustrates a partial top view of the semiconductor package 1 in FIG. 1B.

Referring to FIG. 1A, a first waveguide 20 is formed on a substrate 10. The substrate 10 has an active surface (e.g., the surface facing upwards in FIG. 1A; sometimes called a front side) and an inactive surface (e.g., the surface facing downwards in FIG. 1A; sometimes called a back side). The first waveguide 20 is formed on the active surface of the substrate 10, for example.

In some embodiments, the substrate 10 includes a semiconductor substrate 100, such as silicon, doped or undoped, or an active layer of a semiconductor-on-insulator (SOI) substrate. The semiconductor substrate 100 may include other semiconductor materials, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. Other substrates, such as multi-layered or gradient substrates, may also serve as the substrate 10. In some embodiments, the substrate 10 further includes a redistribution structure 102 at the front side. The redistribution structure 102 may be formed of alternating layers of dielectric (e.g., low-k dielectric material) and conductive material (e.g., copper) with vias interconnecting the layers of conductive material and may be formed through any suitable process (such as deposition, damascene, dual damascene, or the like). In some embodiments, the substrate 10 further includes connectors 104 disposed on the redistribution structure 102 and electrically connected to the redistribution structure 102 to allow external connectivity. In other embodiments, a redistribution structure serves as the substrate 10, and the semiconductor substrate 100 may be omitted. In some alternative embodiments, a system on integrated substrate (SoIS) or an integrated fan-out (InFO) package serves as the substrate 10.

In some embodiments, the first waveguide 20 includes a first bottom dielectric layer 200, a first polymer waveguide 202, and a first top dielectric layer 204 sequentially stacked on the substrate 10, but not limited thereto.

The first bottom dielectric layer 200 may be formed of a photo-sensitive material or a non-photo-sensitive material. For example, the photo-sensitive material includes polybenzoxazole (PBO), polyimide, benzocyclobutene (BCB), or the like; the non-photo-sensitive material includes silicon oxide, or the like. Material of the first bottom dielectric layer 200 may be formed on the substrate 10 by spin coating, lamination, chemical vapor deposition (CVD), the like, or a combination thereof. Then, the photo-sensitive material layer or the non-photo-sensitive material layer is patterned by an acceptable process to formed the first bottom dielectric layer 200. The patterning process may include exposing and developing processes when the first bottom dielectric layer 200 is formed of the photo-sensitive material. The patterning process may include an etching process using, for example, an anisotropic etch when the first bottom dielectric layer 200 is formed of the non-photo-sensitive material.

Subsequently, the first polymer waveguide 202 is formed on the first bottom dielectric layer 200. The first polymer waveguide 202 may be formed of an organic polymer, such as polyimide, polyolefin, PBO, the like, or a combination thereof. Subsequently, the organic polymer material layer is patterned using suitable photolithography processes.

Subsequently, the first top dielectric layer 204 is formed on the first polymer waveguide 202. The first top dielectric layer 204 may be formed in a manner similar to the first bottom dielectric layer 200, and may be formed of a similar material as the first bottom dielectric layer 200.

Referring to FIG. 1A and FIG. 1B, a semiconductor die 30 is formed on the substrate 10 subsequent to forming the first waveguide 20 on the substrate 10, wherein the semiconductor die 30 as well as the first waveguide 20 are formed on the active surface of the substrate 10.

The semiconductor die 30 may be a system on integrated circuit (SoIC) die and may include one or more of the integrated circuit dies packaged to form an integrated circuit package. In some embodiments, the semiconductor die 30 includes a first die (not shown) and a second die (not shown) electrically connected to the first die. The first die and the second die may be vertically or horizontally arranged according to design. The first die is, for example, a photonic integrated circuit (PIC) die, and the second die is, for example, an electronic integrated circuit (EIC) die.

The EIC die is a device having integration of electronic circuits and components onto a substrate of a semiconductor material by processes of fabrication. The substrate materials include, but are not limited to, silicon (Si), Silicon on insulator (SOI), germanium (Ge), indium phosphide (InP), gallium arsenide (GaAs), gallium nitride (GaN), or the like. Integrated electronic circuits include a combination of active electronic devices with passive components. The active electronic devices include, but are not limited to, transistors, diodes, etc. The passive components include, but are not limited to, resistors, capacitors, inductor, etc. The processes involved in the fabrication of integrated circuits can include, but are not limited to, vapor-phase deposition of semiconductors and insulators, oxidation, solid-state diffusion, ion implantation, vacuum deposition and sputtering, etc.

The PIC die is a device that integrates multiple photonic functions. While EIC process signals are imposed on electrical currents or voltages, the PIC process signals are imposed on optical beams. These optical beams typically have wavelengths ranging from the UV/visible spectrum (200-750 nm) to near Infrared spectrum (750 nm-1650 nm). The materials used for the fabrication of PICs include, but are not limited to, silica (SiO2) on silicon, silicon on insulator (SOI), various polymers and compound semiconductor materials such as GaAs, InP, and GaN.

Integrated photonic devices can be classified into "passive photonic devices" that do not consume or exchange energy; "emissive/absorptive photonic devices" that involve light emission, optical gain, and absorption, or electronic energy level transitions that give rise to the spontaneous emission, stimulated emission, or absorption of photons; "electro-optic devices" that require an applied electrical voltage or current but do not require optical emission/absorption for their main functionalities; and nonlinear optical devices that involve nonlinear-optical properties of materials.

Passive photonic devices include, but are not limited to, optical beam splitters, optical wavelength filters, optical resonators, optical waveguides, optical wavelength multiplexers, optical couplers, optical polarizers, optical isolators, polarization rotators, etc. Emissive photonic devices include, but are not limited to, optical amplifiers, lasers, and light-emitting devices. Absorptive photonic devices include photodetectors, etc. Electro-optic devices include, but are not limited to, electro-optic modulators, electro-optic phase shifters, electro-optic switches, etc. Nonlinear-optical devices include second harmonic generators, photonic transistor, and all-optical switches, etc. Emissive/absorptive, electro-optic, and nonlinear optical devices together are part of "active devices" that are devices that consume or exchange energy.

Beside the above, there are other active devices such as opto-mechanical devices that involve mechanical power but the above are the main classes of active photonic devices of interest here. These active devices of interest are sometimes classified into optoelectronic devices (those that involve applied electrical power) and all optical devices that do not involve applied electrical power. All optical devices are typically devices that involve direct interaction of light with light. These nomenclatures are not always precise in usage and are defined above specifically for their application here.

The semiconductor die 30 further includes a second waveguide 300 for optical signal transmission. In some embodiments, the second waveguide 300 is in the first die, and the second waveguide 300 includes a silicon waveguide 3000 consisting of a layer of silicon.

The semiconductor die 30 may further include insulating layers 302 and 304, vias 306 and 308, conductive connectors 310, and conductive bumps 312, but are not limited thereto. One or more additional elements or layers may be added or incorporated into the semiconductor die 30 according to needs.

The insulating layer 302 is disposed between the second waveguide 300 and the insulating layer 304. In some embodiments, the insulating layer 302 includes a dielectric material, such as silicon oxide, silicon nitride, or the like. The insulating layer 304 is disposed between the insulating layer 302 and the conductive connectors 310. In some embodiments, the insulating layer 304 includes polyimide, polyolefin, a combination thereof, or the like and may be formed using spin coating, or the like. The vias 306 extend through the insulating layer 302 to physically and electrically couple the redistribution structure (not shown) in the semiconductor die 30 and the vias 308. The vias 308 extend through the insulating layer 304 to physically and electrically couple the vias 306 and the conductive connectors 310. The conductive connectors 310 is disposed on an outer surface of the insulating layer 304. The conductive connectors 310 may be formed of the same material (e.g., copper) as the vias 306 and 308, but not limited thereto. The conductive bumps 312 are disposed on the conductive connectors 310. The conductive bumps 312 may be ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive bumps 312 may include a conductive material such as solder, copper, aluminum, gold, nickel, silver, palladium, tin, the like, or a combination thereof. In some embodiments, the conductive bumps 312 are formed by initially forming a layer of solder through evaporation, electroplating, printing, solder transfer, ball placement, or the like. Once a layer of solder has been formed on the structure, a reflow may be performed in order to shape the material into the desired bump shapes. In other embodiments, the conductive bumps 312 include metal pillars (such as a copper pillar) formed by a sputtering, printing, electro plating, electroless plating, CVD, or the like. In some embodiments, the conductive bumps 312 are bonded to the connectors 104 of the substrate 10 through a heating process.

Referring to FIG. 1B and FIG. 2, by controlling thicknesses of the components (e.g., the conductive bumps 312) between the second waveguide 300 and the substrate 10, the second waveguide 300 can be aligned with the first waveguide 20 after the conductive bumps 312 are bonded to the connectors 104. Specifically, the second waveguide 300 may have a tip T that is aligned with or points to the first polymer waveguide 202 of the first waveguide 20, and the first polymer waveguide 202 may have a broaden portion BP1 adjacent to the second waveguide 300. The second waveguide 300 being aligned with the first waveguide 20 may refer to the tip T is aligned with or points to a center of the broaden portion BP1 in the top view of the semiconductor package 1 (as shown in FIG. 2), and the tip T and the first polymer waveguide 202 have the same or similar height in the cross-sectional view of the semiconductor package 1 (as shown in FIG. 1B). For example, the height of the tip T (e.g., the vertical distance between the center of the tip T and the bottom surface of the substrate 10) is between the height of the lower surface of the first polymer waveguide 202 and the height of the upper surface of the first polymer waveguide 202. In some embodiments, the tip T ends at an edge (e.g., an edge E1 facing the first waveguide 20) of the semiconductor die 30, but not limited thereto.

An adhesive layer 40 is disposed between the first waveguide 20 and the second waveguide 300 after the conductive bumps 312 are bonded to the connectors 104. The adhesive layer 40 assists in fixing the first waveguide 20 and the semiconductor die 30 and optically coupling the first polymer waveguide 202 to the second waveguide 300. Specifically, after the semiconductor die 30 is disposed on the substrate 10, a gap may be formed between the first waveguide 20 and the semiconductor die 30, and a distance D is kept between the first polymer waveguide 202 and the second waveguide 300. By disposing the adhesive layer 40 between the first waveguide 20 and the second waveguide 300, the gap between the first waveguide 20 and the semiconductor die 30 may be filled by the adhesive layer 40, and the adhesive layer 40 may serve as a medium for optical transmission. In some embodiments, the adhesive layer 40 may include any suitable adhesive, epoxy, die attach film (DAF), or the like.

In some embodiments, an underfill 50 is formed between the semiconductor die 30 and the substrate 10 and surrounding the connectors 104, the conductive connectors 310, and the conductive bumps 312 prior to disposing the adhesive layer 40 between the first waveguide 20 and the second waveguide 300. The underfill 50 may be formed by a capillary flow process after the semiconductor die 30 is attached to the substrate 10 or may be formed by a suitable deposition method before the semiconductor die 30 is attached to the substrate 10. Under the existence of the underfill 50, the adhesive layer 40 extended beneath the semiconductor die 30 is enclosed by the substrate 10, the first waveguide 20, the semiconductor die 30, and the underfill 50, and the adhesive layer 40 may be in contact with at least one of the first bottom dielectric layer 200, the first polymer waveguide 202, the first top dielectric layer 204, the silicon waveguide 3000, the insulating layer 302, the insulating layer 304, the underfill 50, and the redistribution structure 102.

In the semiconductor package 1, by integrating the first waveguide 20 into the semiconductor package 1, tolerance in a first direction D1 (e.g., a direction perpendicular to of the arrangement direction of the first waveguide 20 and the semiconductor die 30) and a second direction D2 (e.g., the normal direction of the substrate 10) can be improved in subsequent optical fiber assembly (e.g., an optical fiber can be disposed at the left-hand side of the first waveguide 20; not shown), and thus higher assembly accuracy and less assembly time can be achieved.

Figure 3A:
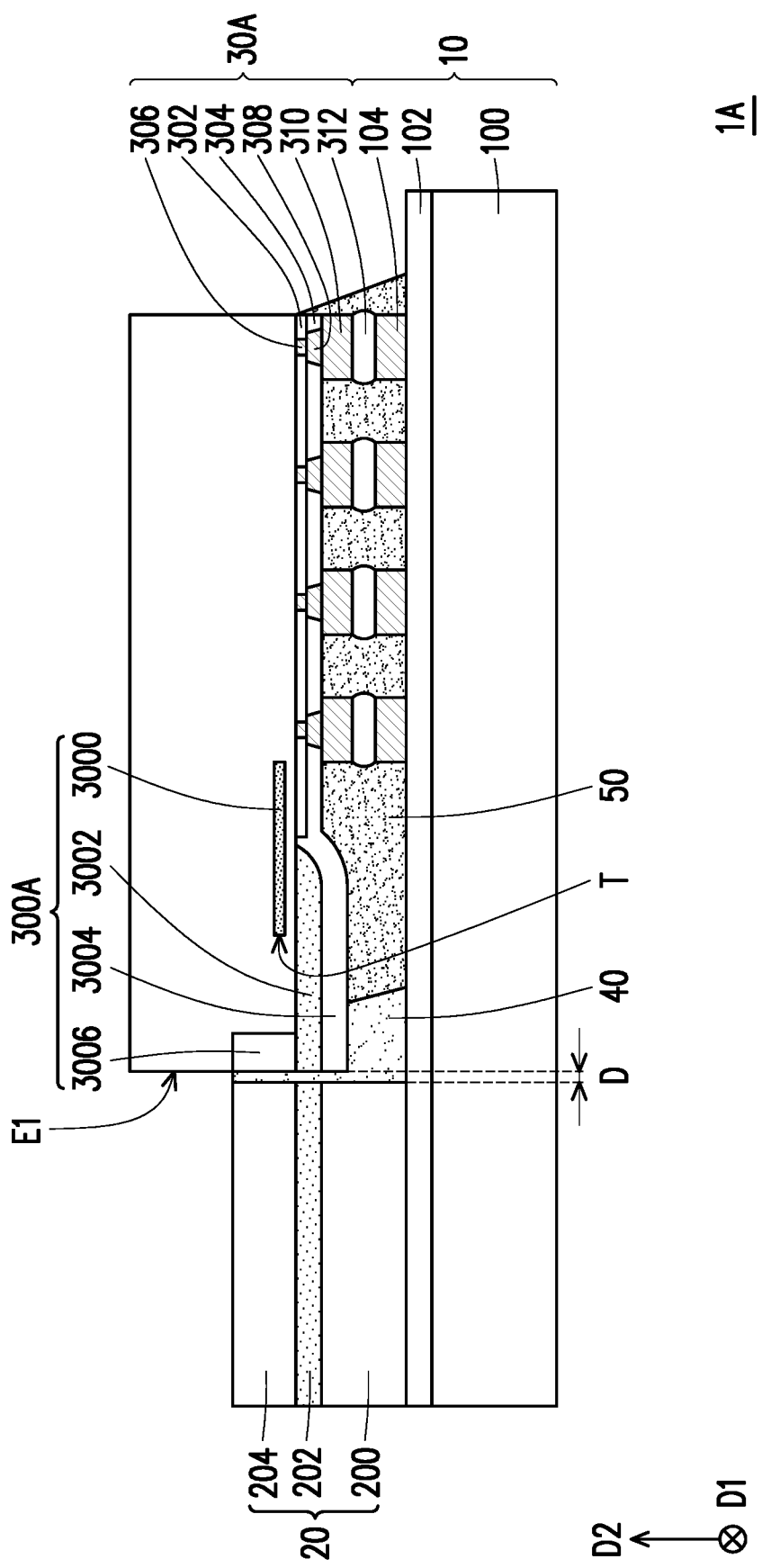
FIG. 3A and FIG. 3B schematically illustrate cross-sectional and partial top views of a semiconductor package in accordance with some embodiments of the disclosure.
Figure 3B:
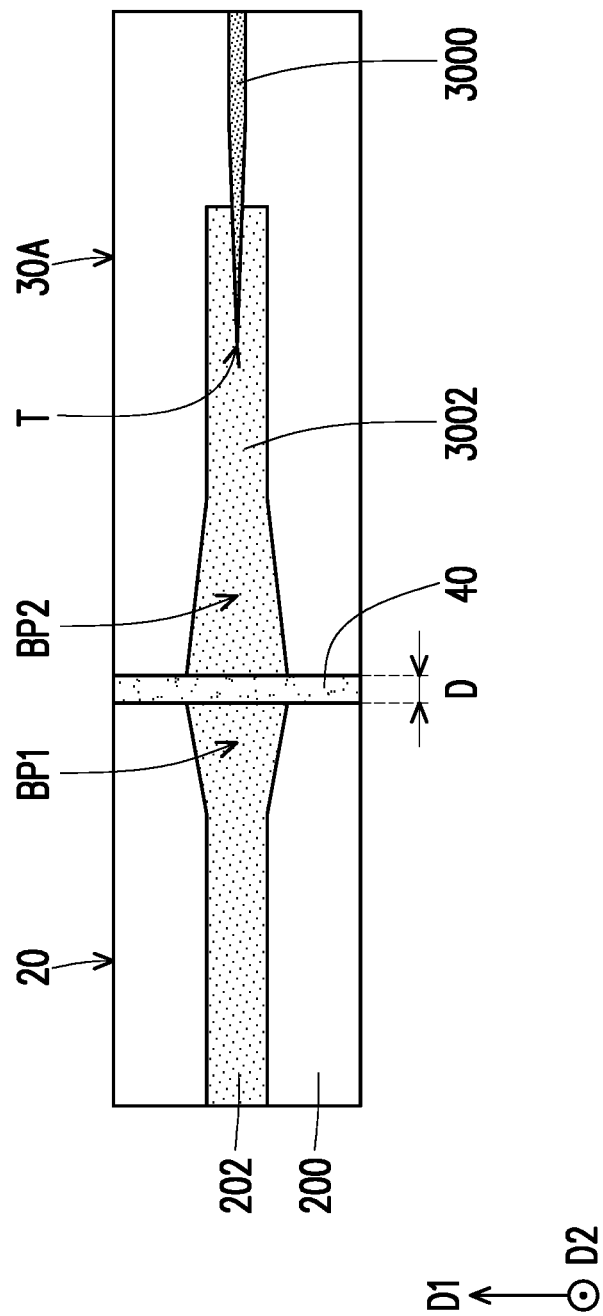

FIG. 3A and FIG. 3B schematically illustrate cross-sectional and partial top views of a semiconductor package 1A in accordance with some embodiments of the disclosure.

Referring to FIG. 3A and FIG. 3B, the semiconductor package 1A is similar to the semiconductor package 1 (see FIG. 1B and FIG. 2), with similar features being labeled with similar numerical references, and descriptions of the similar features are not repeated herein. In some embodiments, the semiconductor package 1A may be formed using the process steps described above with reference to FIG. 1A and FIG. 1B and the description is not repeated herein.

In a semiconductor die 30A of the semiconductor package 1A, the tip T of the silicon waveguide 3000 ends in the semiconductor die 30A and away from the edge (e.g., the edge E1 facing the first waveguide 20) of the semiconductor die 30A. The second waveguide 300A further includes a second polymer waveguide 3002, a second bottom dielectric layer 3004, and a second top dielectric layer 3006 in addition to the silicon waveguide 3000.

The second polymer waveguide 3002 is disposed between the silicon waveguide 3000 and the second bottom dielectric layer 3004 and between the second top dielectric layer 3006 and the second bottom dielectric layer 3004. In some embodiments, the second polymer waveguide 3002 is aligned with the first polymer waveguide 202. Specifically, a broaden portion BP2 of the second polymer waveguide 3002 is aligned with the broaden portion BP1 of the first polymer waveguide 202 in the top view of the semiconductor package 1A (as shown in FIG. 3B), and the second polymer waveguide 3002 and the first polymer waveguide 202 have the same or similar height in the cross-sectional view of the semiconductor package 1A (as shown in FIG. 3A). The second polymer waveguide 3002 may be formed in a manner similar to the first polymer waveguide 202, and may be formed of a similar material as the first polymer waveguide 202.

The second bottom dielectric layer 3004 is disposed between the second polymer waveguide 3002 and the underfill 50. In some embodiments, the second bottom dielectric layer 3004 ends at the edge E1 of the semiconductor die 30A, but not limited thereto. In some embodiments, the second bottom dielectric layer 3004 and the insulating layer 304 are formed together. In other words, the second bottom dielectric layer 3004 may be formed in a manner the same as the insulating layer 304, and may be formed of the same material as the insulating layer 304. In other embodiments, the second bottom dielectric layer 3004 is formed subsequent or prior to the insulating layer 304, and the second bottom dielectric layer 3004 may be formed in a manner similar to the insulating layer 304, and may be formed of a similar material as the insulating layer 304.

The second top dielectric layer 3006 is disposed on the second polymer waveguide 3002, between the silicon waveguide 3000 and the first top dielectric layer 204, and adjacent to the edge E1 of the semiconductor die 30A. In some embodiments, the second top dielectric layer 3006 ends at the edge E1 of the semiconductor die 30A, but not limited thereto. In some embodiments, the second top dielectric layer 3006 may be formed in a manner similar to the second bottom dielectric layer 3004, and may be formed of a similar material as the second bottom dielectric layer 3004.

The adhesive layer 40 is disposed between the first waveguide 20 and the second waveguide 300A after the conductive bumps 312 are bonded to the connectors 104. In some embodiments, the adhesive layer 40 is in contact with at least one of the first bottom dielectric layer 200, the first polymer waveguide 202, the first top dielectric layer 204, the second top dielectric layer 3006, the second polymer waveguide 3002, the second bottom dielectric layer 3004, the underfill 50, and the redistribution structure 102.

In the semiconductor package 1A, the silicon waveguide 3000 is optically coupled to the first polymer waveguide 202 through the second polymer waveguide 3002 and the adhesive layer 40. By integrating the second polymer waveguide 3002 into the second waveguide 300A, tolerance in the first direction D1 and the second direction D2 can be improved when aligning the second waveguide 300A with the first waveguide 20, and thus higher alignment accuracy and less alignment time can be achieved. In addition, by integrating the first waveguide 20 into the semiconductor package 1A, tolerance in the first direction D1 and the second direction D2 can be improved in subsequent optical fiber assembly (e.g., an optical fiber can be disposed at the left-hand side of the first waveguide 20; not shown), and thus higher assembly accuracy and less assembly time can be achieved. Moreover, by making the refractive index design of the second top dielectric layer 3006, the second polymer waveguide 3002, and the second bottom dielectric layer 3004 meet the condition of total internal reflection, the amount of light leaking from the second polymer waveguide 3002 can be reduced. In this way, optical loss inside the semiconductor die 30A or at the edge E1 of the semiconductor die 30A can be reduced.

Figure 4:
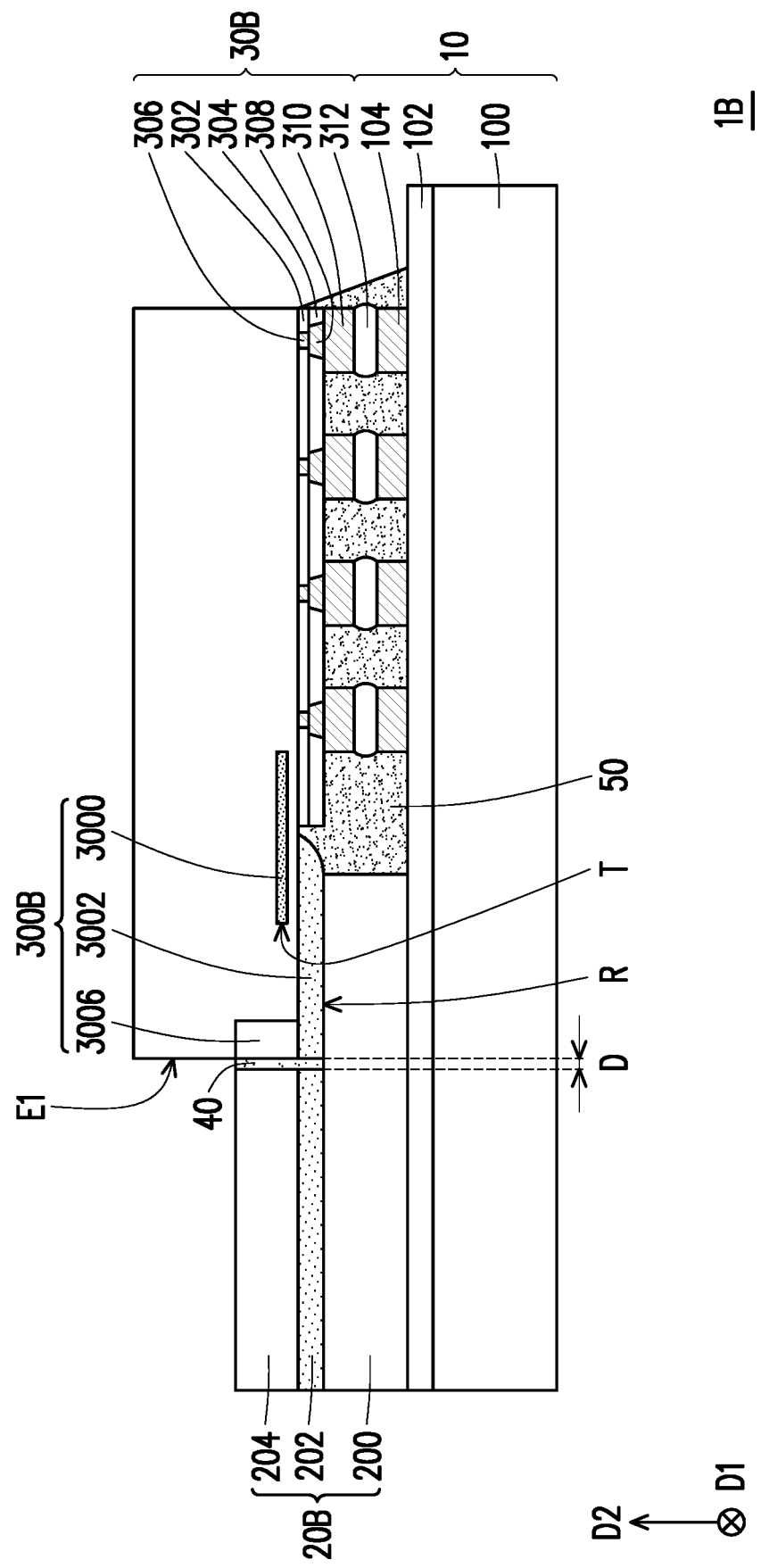
FIG. 4 schematically illustrates a semiconductor package in accordance with some embodiments of the disclosure.

FIG. 4 schematically illustrates a semiconductor package 1B in accordance with some embodiments of the disclosure. A partial top view of the semiconductor package 1B is similar to the partial top view of the semiconductor package 1A in FIG. 3B. Therefore, the partial top view of the semiconductor package 1B is omitted.

Referring to FIG. 4, the semiconductor package 1B is similar to the semiconductor package 1A (see FIG. 3A and FIG. 3B), with similar features being labeled with similar numerical references, and descriptions of the similar features are not repeated herein. In some embodiments, the semiconductor package 1B may be formed using the process steps described above with reference to FIG. 1A and FIG. 1B and the description is not repeated herein.

In the semiconductor package 1B, a second waveguide 300B includes the silicon waveguide 3000, the second polymer waveguide 3002, and the second top dielectric layer 3006. The first waveguide 20B has a recessed portion R that supports the second waveguide 300B and assists in alignment of the second waveguide 300B with the first waveguide 20B. For example, a portion of the second polymer waveguide 202 and the first top dielectric layer 204 on the portion of the second polymer waveguide 202 are removed to form the recessed portion R, and a portion of the first bottom dielectric layer 200 is exposed by the first polymer waveguide 202. In some embodiments, the second polymer waveguide 3002 is in contact with the portion of the first bottom dielectric layer 200 after the conductive bumps 312 are bonded to the connectors 104, and the adhesive layer 40 is in contact with at least one of the first bottom dielectric layer 200, the first polymer waveguide 202, the first top dielectric layer 204, the second top dielectric layer 3006, and the second polymer waveguide 3002.

In the semiconductor package 1B, the silicon waveguide 3000 is optically coupled to the first polymer waveguide 202 through the second polymer waveguide 3002 and the adhesive layer 40. By the design of the recessed portion R, higher alignment accuracy and less alignment time can be achieved when aligning the second polymer waveguide 3002 with the first polymer waveguide 202. In addition, by integrating the first waveguide 20B into the semiconductor package 1B, tolerance in the first direction D1 and the second direction D2 can be improved in subsequent optical fiber assembly (e.g., an optical fiber can be disposed at the left-hand side of the first waveguide 20B; not shown), and thus higher assembly accuracy and less assembly time can be achieved. Moreover, by making the refractive index design of the second top dielectric layer 3006, the second polymer waveguide 3002, and the first bottom dielectric layer 200 meet the condition of total internal reflection, the amount of light leaking from the second polymer waveguide 3002 can be reduced. In this way, optical loss inside the semiconductor die 30B or at the edge E1 of the semiconductor die 30B can be reduced.

Figure 5:
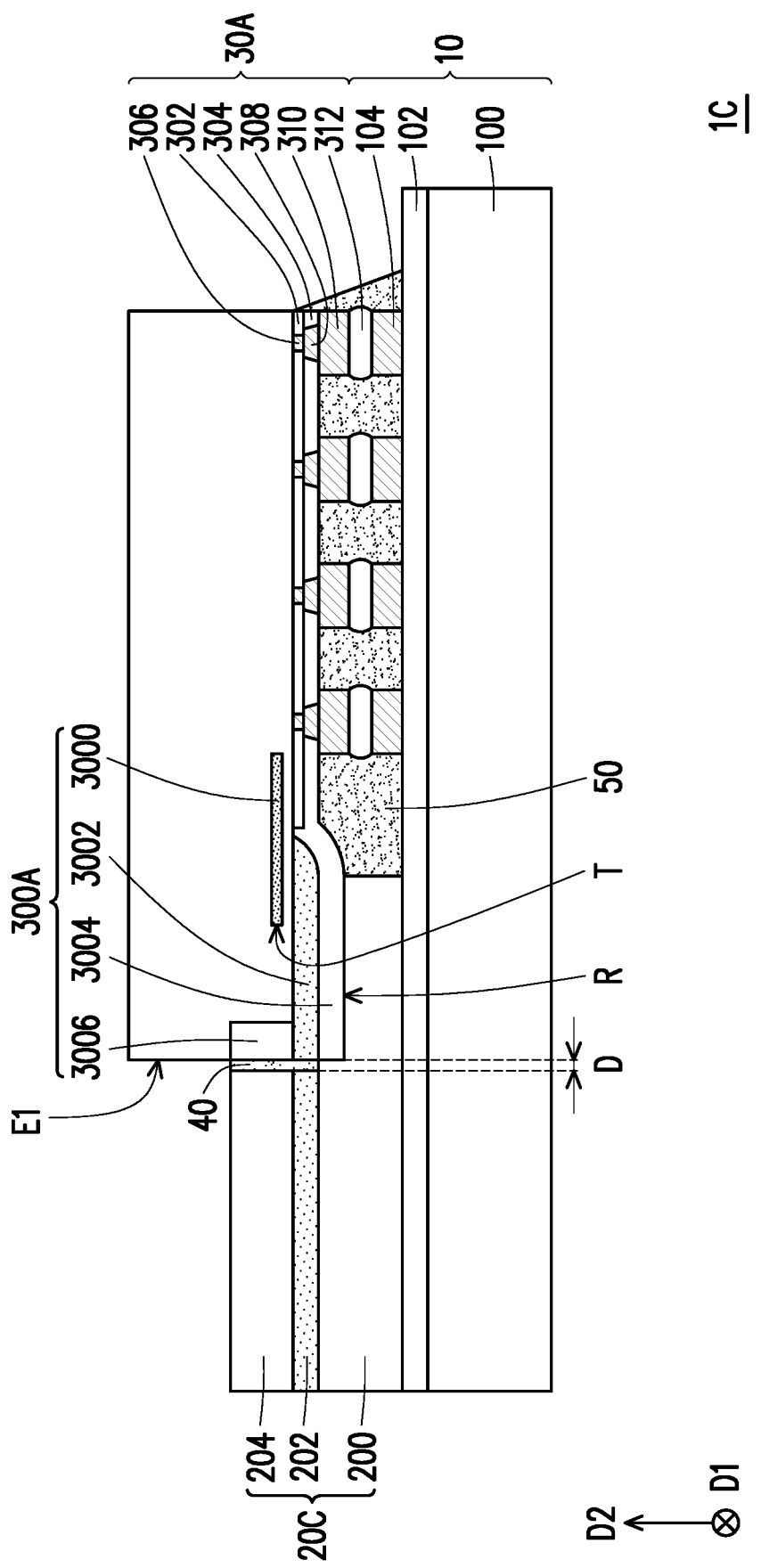
FIG. 5 schematically illustrates a semiconductor package in accordance with some embodiments of the disclosure.

FIG. 5 schematically illustrates a semiconductor package 1C in accordance with some embodiments of the disclosure. A partial top view of the semiconductor package 1C is similar to the partial top view of the semiconductor package 1A in FIG. 3B. Therefore, the partial top view of the semiconductor package 1C is omitted.

Referring to FIG. 5, the semiconductor package 1C is similar to the semiconductor package 1A (see FIG. 3A) and the semiconductor package 1B (see FIG. 4), with similar features being labeled with similar numerical references, and descriptions of the similar features are not repeated herein. In some embodiments, the semiconductor package 1C may be formed using the process steps described above with reference to FIG. 1A and FIG. 1B and the description is not repeated herein.

In a first waveguide 20C of the semiconductor package 1C, the recessed portion R is formed by further removing a portion of the first bottom dielectric layer 200, such that the thickness of the first bottom dielectric layer 200 overlapped with the recessed portion R is smaller than the thickness of the first bottom dielectric layer 200 outside the recessed portion R. In some embodiments, the second bottom dielectric layer 3004 is in contact with the first bottom dielectric layer 200 after the conductive bumps 312 are bonded to the connectors 104, and the adhesive layer 40 is in contact with at least one of the first bottom dielectric layer 200, the first polymer waveguide 202, the first top dielectric layer 204, the second top dielectric layer 3006, and the second polymer waveguide 3002.

In the semiconductor package 1C, the silicon waveguide 3000 is optically coupled to the first polymer waveguide 202 through the second polymer waveguide 3002 and the adhesive layer 40. By the design of the recessed portion R, higher alignment accuracy and less alignment time can be achieved when aligning the second polymer waveguide 3002 with the first polymer waveguide 202. In addition, by integrating the first waveguide 20C into the semiconductor package 1C, tolerance in the first direction D1 and the second direction D2 can be improved in subsequent optical fiber assembly (e.g., an optical fiber can be disposed at the left-hand side of the first waveguide 20C; not shown), and thus higher assembly accuracy and less assembly time can be achieved. Moreover, by making the refractive index design of the second top dielectric layer 3006, the second polymer waveguide 3002, and the second bottom dielectric layer 3004 meet the condition of total internal reflection, the amount of light leaking from the second polymer waveguide 3002 can be reduced. In this way, optical loss inside the semiconductor die 30A or at the edge E1 of the semiconductor die 30A can be reduced.

Figure 6A:
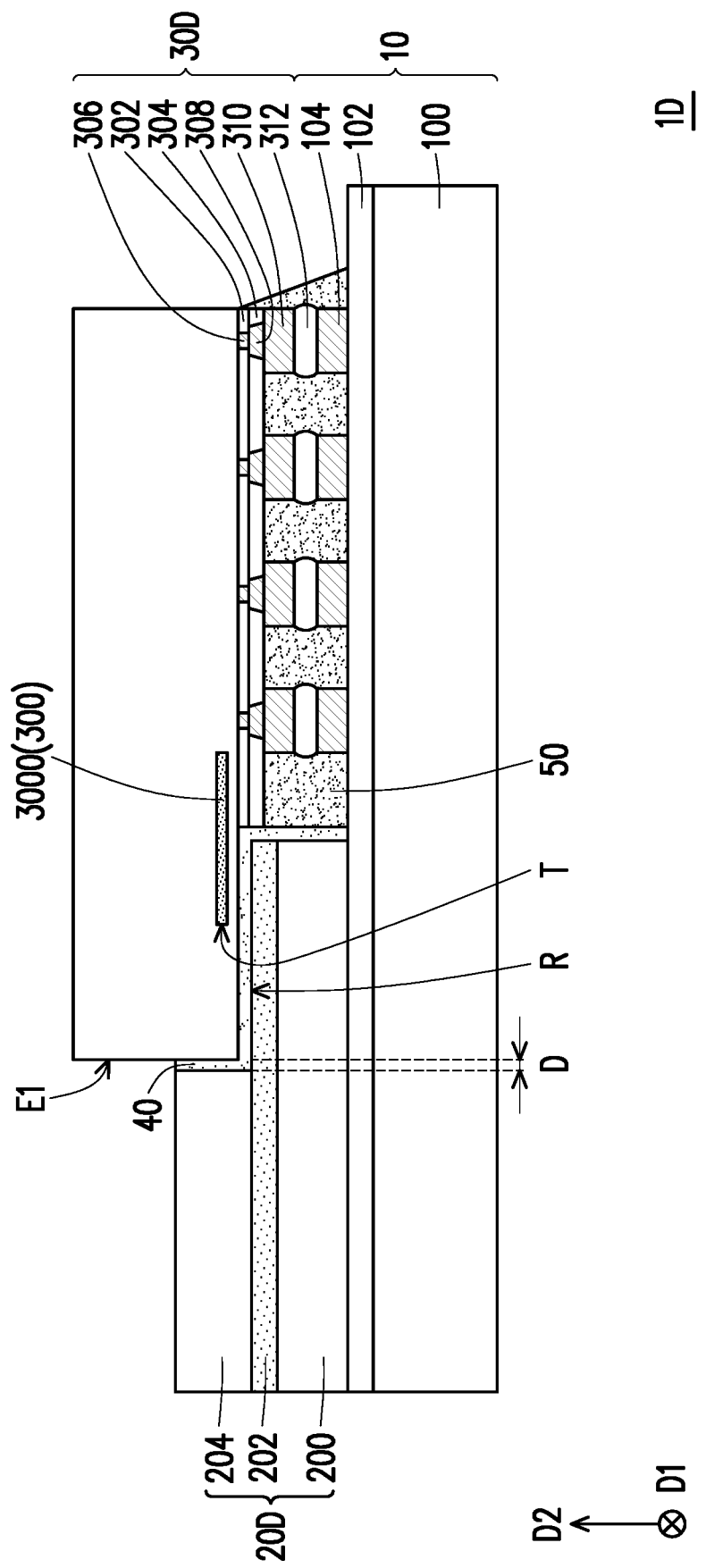
FIG. 6A and FIG. 6B schematically illustrate cross-sectional and partial top views of a semiconductor package in accordance with some embodiments of the disclosure.
Figure 6B:
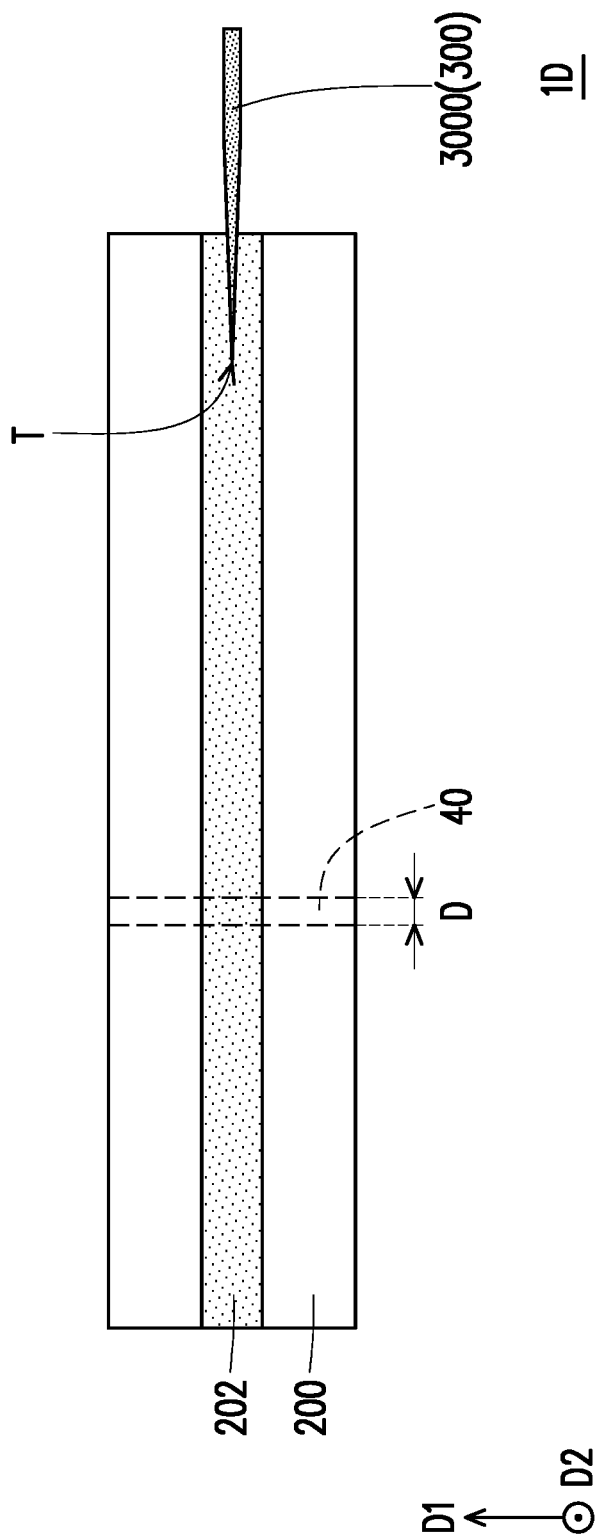

FIG. 6A and FIG. 6B schematically illustrate cross-sectional and partial top views of a semiconductor package 1D in accordance with some embodiments of the disclosure.

Referring to FIG. 6A and FIG. 6B, the semiconductor package 1D is similar to the semiconductor package 1 (see FIG. 1B) and the semiconductor package 1B (see FIG. 4), with similar features being labeled with similar numerical references, and descriptions of the similar features are not repeated herein. In some embodiments, the semiconductor package 1D may be formed using the process steps described above with reference to FIG. 1A and FIG. 1B and the description is not repeated herein.

In a semiconductor die 30D of the semiconductor package 1D, the tip T of the silicon waveguide 3000 ends in the semiconductor die 30D and away from the edge (e.g., the edge E1 facing the first waveguide 20D) of the semiconductor die 30D. In a first waveguide 20D of the semiconductor package 1D, a portion of the first top dielectric layer 204 is removed to form the recessed portion R, and a portion of the first polymer waveguide 202 is exposed by the first top dielectric layer 204. The silicon waveguide 3000 of the second waveguide 300 is disposed on the portion of the first polymer waveguide 202, such that the portion of the first polymer waveguide 202 is disposed between the silicon waveguide 3000 and the substrate 10. In some embodiments, the silicon waveguide 3000 is optically coupled to the first polymer waveguide 202 through the adhesive layer 40, and the adhesive layer 40 is in contact with at least one of the first bottom dielectric layer 200, the first polymer waveguide 202, the first top dielectric layer 204, the insulating layer 302, the insulating layer 304, the underfill 50, and the redistribution structure 102.

In the semiconductor package 1D, by the design of the recessed portion R, higher alignment accuracy and less alignment time can be achieved when aligning the silicon waveguide 3000 with the first polymer waveguide 202. In addition, by integrating the first waveguide 20D into the semiconductor package 1D, tolerance in the first direction D1 and the second direction D2 can be improved in subsequent optical fiber assembly (e.g., an optical fiber can be disposed at the left-hand side of the first waveguide 20D; not shown), and thus higher assembly accuracy and less assembly time can be achieved.

Figure 7:
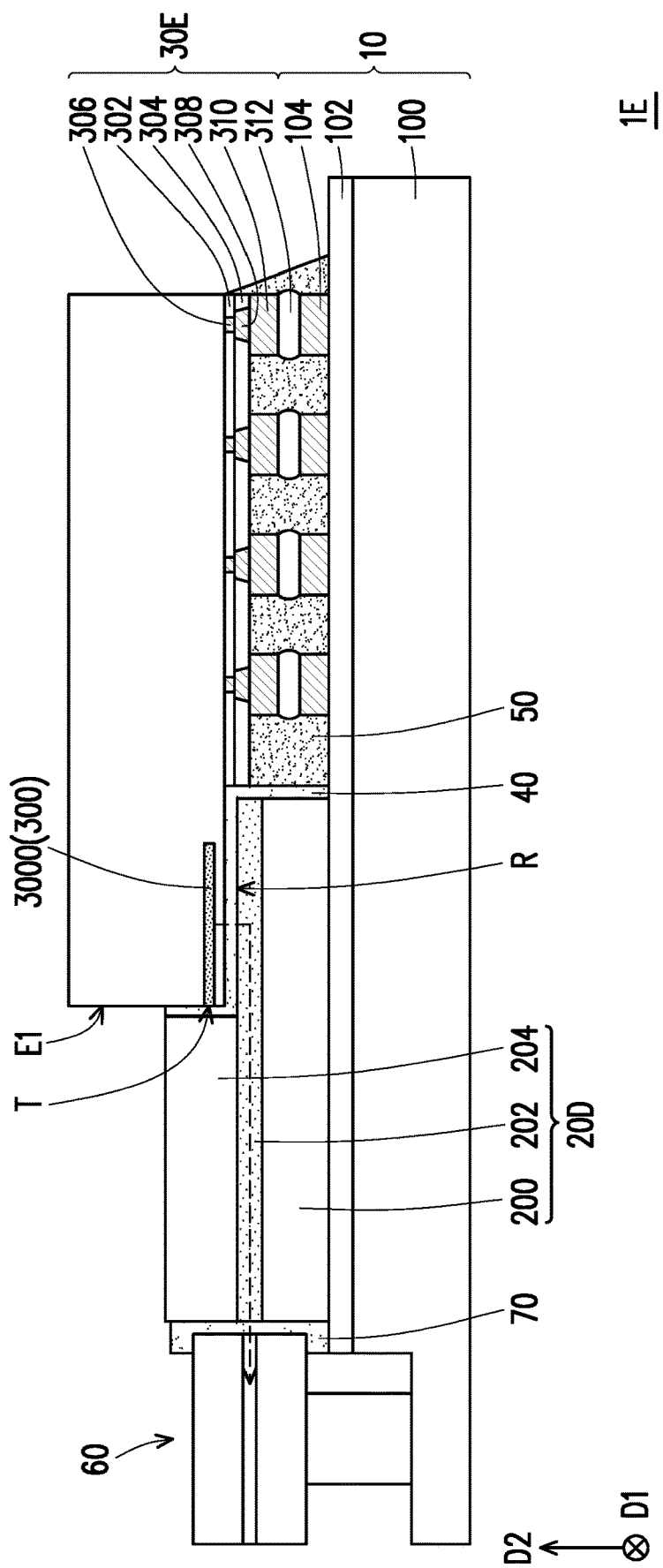
FIG. 7 schematically illustrates a semiconductor package in accordance with some embodiments of the disclosure.

FIG. 7 schematically illustrates a semiconductor package 1E in accordance with some embodiments of the disclosure. A partial top view of the semiconductor package 1E is similar to the partial top view of the semiconductor package 1D in FIG. 6B. Therefore, the partial top view of the semiconductor package 1E is omitted.

Referring to FIG. 7, the semiconductor package 1E is similar to the semiconductor package 1D (see FIG. 6A), with similar features being labeled with similar numerical references, and descriptions of the similar features are not repeated herein. In some embodiments, the semiconductor package 1E may be formed using the process steps described above with reference to FIG. 1A and FIG. 1B and the description is not repeated herein.

In a semiconductor die 30E of the semiconductor package 1E, the tip T ends at an edge (e.g., an edge E1 facing the first waveguide 20D) of the semiconductor die 30E. The semiconductor package 1E further includes an optical fiber 60 in addition to the substrate 10, the first waveguide 20D, the semiconductor die 30D, the adhesive layer 40, and the underfill 50. The optical fiber 60 is disposed on the substrate 10 and optically coupled to the second waveguide 300 through the first waveguide 20D. Specifically, the light (see the dash line in FIG. 7) from the silicon waveguide 3000 of the second waveguide 300 is transmitted to the optical fiber 60 sequentially through the adhesive layer 40 and the first polymer waveguide 202 of the first waveguide 20D.

In some embodiments, the semiconductor package 1E further includes an adhesive layer 70 disposed between the first waveguide 20D and the optical fiber 60. The adhesive layer 70 assists in fixing the first waveguide 20D and the optical fiber 60 and optically coupling the first polymer waveguide 202 to the optical fiber 60. Specifically, after the optical fiber 60 is disposed on the substrate 10, a gap may be formed between the first waveguide 20 and the optical fiber 60. By disposing the adhesive layer 70 between the first waveguide 20 and the optical fiber 60, the gap between the first waveguide 20 and the optical fiber 60 may be filled by the adhesive layer 70, and the adhesive layer 70 may serve as a medium for optical transmission. In some embodiments, the adhesive layer 70 may include any suitable adhesive, epoxy, DAF, or the like.

Any embodiment in the disclosure may further include an optical fiber (e.g., the optical fiber 60 shown in FIG. 7) and an element (e.g., the adhesive layer 70 shown in FIG. 7) for fixing the optical fiber and the first waveguide, which will not be repeated below.

Figure 8:
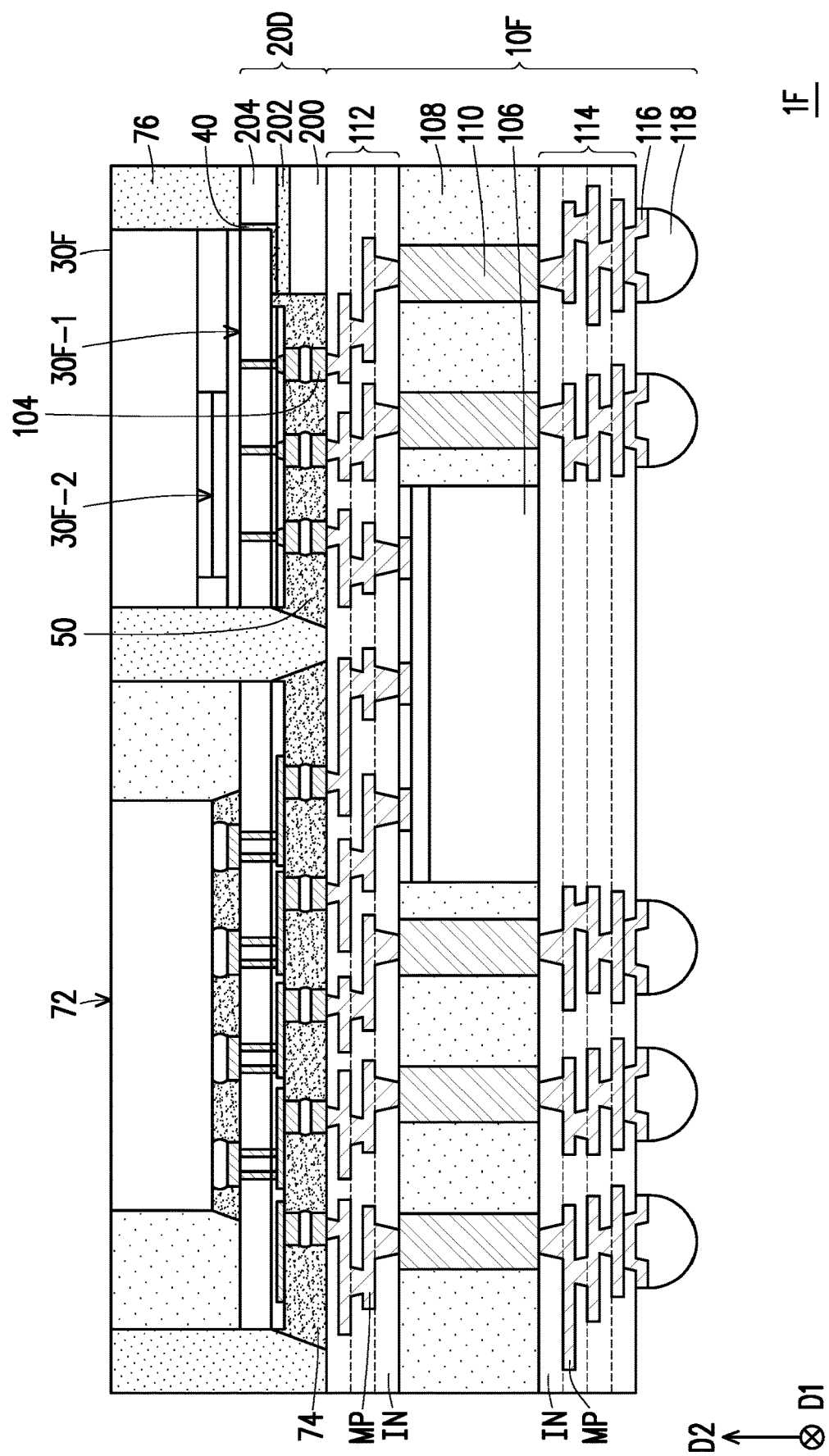
FIG. 8 schematically illustrates a semiconductor package in accordance with some embodiments of the disclosure.

FIG. 8 schematically illustrates a semiconductor package IF in accordance with some embodiments of the disclosure. Referring to FIG. 8, the semiconductor package IF may include a substrate 10F, the first waveguide 20D, a semiconductor die 30F, the adhesive layer 40, the underfill 50, a package 72, an underfill 74, and an encapsulant 76.

In some embodiments, the substrate 10F is an integrated fan-out (InFO) package and includes the connectors 104, an integrated circuit die 106, an encapsulant 108, through vias 110, a first redistribution structure 112, a second redistribution structure 114, under-bump metallizations (UBM) 116, and conductive connectors 118.

The integrated circuit die 106 is, for example, a bridge die for electrical signal interconnection between the semiconductor die 30F and the package 72. In some embodiments, the integrated circuit die 106 includes a logic die (e.g., central processing unit (CPU), graphics processing unit (GPU), system-on-a-chip (SoC), application processor (AP), microcontroller, etc.), a memory die (e.g., dynamic random access memory (DRAM) die, static random access memory (SRAM) die, etc.), a power management die (e.g., power management integrated circuit (PMIC) die), a radio frequency (RF) die, a sensor die, a micro-electro-mechanical-system (MEMS) die, a signal processing die (e.g., digital signal processing (DSP) die), a front-end die (e.g., analog front-end (AFE) dies), the like, or combinations thereof.

The through vias 110 are disposed next to the integrated circuit die 106, and the through vias 110 and the integrated circuit die 106 are surrounded by the encapsulant 108. The encapsulant 108 may be a molding compound, epoxy, or the like. The encapsulant 108 may be applied by compression molding, transfer molding, or the like. The encapsulant 108 may be applied in liquid or semi-liquid form and then subsequently cured.

The through vias 110 penetrate the encapsulant 108 to electrically connect the first redistribution structure 112 and the second redistribution structure 114 which are located on opposite sides of the encapsulant 108. For example, the first redistribution structure 112 is disposed on a top surface of the encapsulant 108 and the second redistribution structure 114 is disposed on a bottom surface of the encapsulant 108.

Each of the first redistribution structure 112 and the second redistribution structure 114 includes insulating layers IN and metallization patterns MP alternately disposed on the encapsulant 108. The insulating layers IN may be formed of a photo-sensitive material (such as PBO, polyimide, BCB, or the like) or a non-photo-sensitive material (such as silicon oxide, silicon nitride, or the like). The insulating layers IN may be formed by spin coating, lamination, CVD, the like, or a combination thereof, and may be patterned by exposing and developing processes or etching processes. The metallization patterns MP may also be referred to as redistribution layers or redistribution lines. The metallization patterns MP include metal lines and vias formed in one or more insulating layers IN. In some embodiments, interconnect structure 60 may be formed of alternating layers of dielectric (e.g., low-k dielectric material) and conductive material (e.g., copper) with vias interconnecting the layers of conductive material and may be formed through any suitable process (such as deposition, damascene, dual damascene, or the like).

The connectors 104 are disposed on and electrically couple to the first redistribution structure 112. The under-bump metallizations 116 are disposed on and electrically couple to the second redistribution structure 114. The under-bump metallizations 116 may be formed of the same material as the metallization pattern MP.

The conductive connectors 118 are disposed on the under-bump metallizations 116. The conductive connectors 118 may be ball grid array (BGA) connectors, solder balls, metal pillars, controlled collapse chip connection (C4) bumps, micro bumps, electroless nickel-electroless palladium-immersion gold technique (ENEPIG) formed bumps, or the like. The conductive connectors 118 may include a conductive material such as solder, copper, aluminum, gold, nickel, silver, palladium, tin, the like, or a combination thereof. In some embodiments, the conductive connectors 118 are formed by initially forming a layer of solder through evaporation, electroplating, printing, solder transfer, ball placement, or the like. Once a layer of solder has been formed on the structure, a reflow may be performed in order to shape the material into the desired bump shapes. In another embodiment, the conductive connectors 118 include metal pillars (such as a copper pillar) formed by a sputtering, printing, electro plating, electroless plating, CVD, or the like. The metal pillars may be solder free and have substantially vertical sidewalls. In some embodiments, a metal cap layer is formed on the top of the metal pillars. The metal cap layer may include nickel, tin, tin-lead, gold, silver, palladium, indium, nickel-palladium-gold, nickel-gold, the like, or a combination thereof and may be formed by a plating process.

The semiconductor die 30F is disposed on the substrate 10F and electrically connected to the first redistribution structure 112 through the connectors 104. In some embodiments, the semiconductor die 30F includes a first die 30E-1 optically couple to the first waveguide 20D and a second die 30E-2 electrically connected to the first die 30E-1. The first die 30E-1 and the second die 30E-2 may be vertically arranged (i.e., arranged along the second direction D2). The first die 30E-1 is, for example, a photonic integrated circuit (PIC) die, and the second die 30E-2 is, for example, an electronic integrated circuit (EIC) die.

The package 72 is disposed on the substrate 10F and electrically connected to the first redistribution structure 112 through the connectors 104. In some embodiments, the package 72 is an application specific integrated circuit (ASIC) die, but not limited thereto.

The underfill 74 is formed between the package 72 and the substrate 11F and surrounding the connectors 104. The underfill 74 may be formed by a capillary flow process after the package 72 is attached to the substrate 10F or may be formed by a suitable deposition method before the package 72 is attached to the substrate 10F.

The encapsulant 76 is formed on and around the semiconductor die 30F and the package 72. The encapsulant 76 may be a molding compound, epoxy, or the like. The encapsulant 76 may be applied by compression molding, transfer molding, or the like, and may be formed over the substrate 10F such that the semiconductor die 30F and the package 72 are buried or covered. The encapsulant 76 is further formed in gap regions between the semiconductor die 30F and the package 72. The encapsulant 76 may be applied in liquid or semi-liquid form and then subsequently cured. A planarization process may be performed on the encapsulant 76 to expose the semiconductor die 30F and the package 72. The planarization process may be, for example, a chemical-mechanical polish (CMP), a grinding process, or the like. In some embodiments, the planarization may be omitted, for example, if the semiconductor die 30F and the package 72 are already exposed.

In other embodiments, the design of the first waveguide or the semiconductor die, or arrangement between the first waveguide and the semiconductor die in the semiconductor package 1F may be changed as described in any of the embodiments described above.

Figure 9:
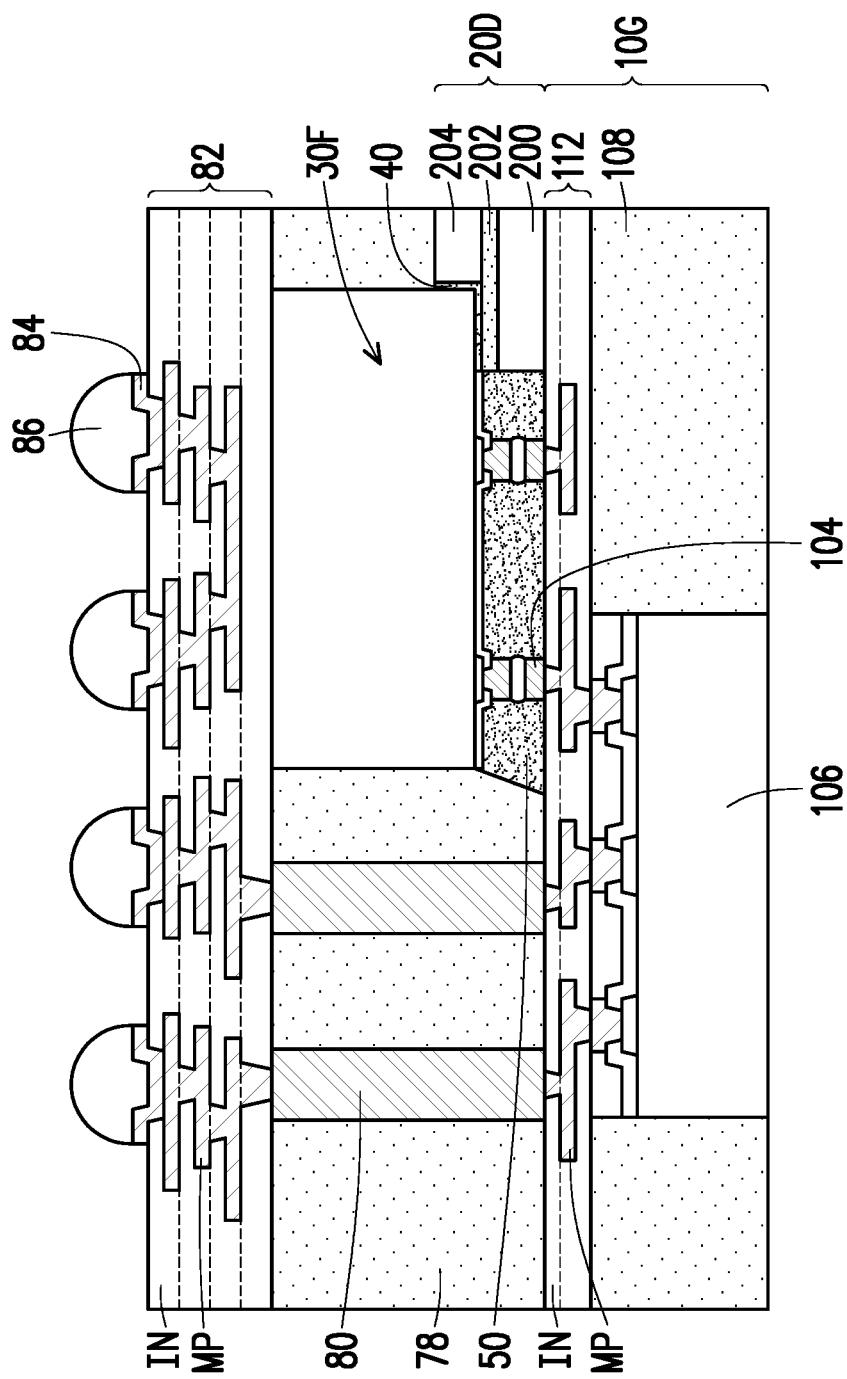
FIG. 9 schematically illustrates a semiconductor package in accordance with some embodiments of the disclosure.

FIG. 9 schematically illustrates a semiconductor package 1G in accordance with some embodiments of the disclosure. Referring to FIG. 9, the semiconductor package 1G is, for example, an integrated fan-out (InFO) package and includes a substrate 10G, the first waveguide 20D, the semiconductor die 30F, the adhesive layer 40, the underfill 50, an encapsulant 78, through vias 80, a redistribution structure 82, under-bump metallizations 84, and conductive connectors 86.

In some embodiments, the substrate 10G includes the connectors 104, the integrated circuit die 106, the encapsulant 108, and the first redistribution structure 112. The integrated circuit die 106 is disposed on and electrically connected to the first redistribution structure 112. The integrated circuit die 106 is surrounded by the encapsulant 108, and a top surface of the integrated circuit die 106 is exposed by the encapsulant 108. In some embodiments, the integrated circuit die 106 is an application specific integrated circuit (ASIC) die, but not limited thereto.

The encapsulant 78 is formed on and around the semiconductor die 30F. The encapsulant 78 may be a molding compound, epoxy, or the like. The encapsulant 78 may be applied by compression molding, transfer molding, or the like, and may be formed over the substrate 10G such that the semiconductor die 30F is buried or covered. The encapsulant 78 may be applied in liquid or semi-liquid form and then subsequently cured. A planarization process may be performed on the encapsulant 78 to expose the semiconductor die 30F. The planarization process may be, for example, a chemical-mechanical polish (CMP), a grinding process, or the like. In some embodiments, the planarization may be omitted, for example, if the semiconductor die 30F is already exposed.

The through vias 80 is in the encapsulant 78 and penetrate the encapsulant 78 to electrically connect the redistribution structure 82 and the first redistribution structure 112 which are located on opposite sides of the encapsulant 78.

The redistribution structure 82 may include insulating layers IN and metallization patterns MP alternately disposed on the encapsulant 78. The insulating layers IN and metallization patterns MP in the redistribution structure 82 may be formed in a manner similar to the insulating layers IN and metallization patterns MP in the first redistribution structure 112, and may be formed of a similar material as the insulating layers IN and metallization patterns MP in the first redistribution structure 112. However, the number of the insulating layers IN or the metallization patterns MP in the redistribution structure 82 may be the same as or different from the number of the insulating layers IN or the metallization patterns MP in the first redistribution structure 112.

The under-bump metallizations 84 are disposed on and electrically connected to the redistribution structure 82. The under-bump metallizations 84 may be formed in a manner similar to the under-bump metallizations 116, and may be formed of a similar material as the under-bump metallizations 116.

The conductive connectors 86 are disposed on and electrically connected to the under-bump metallizations 84. The conductive connectors 86 may be formed in a manner similar to the conductive connectors 118, and may be formed of a similar material as the conductive connectors 118.

In other embodiments, the design of the first waveguide or the semiconductor die, or arrangement between the first waveguide and the semiconductor die in the semiconductor package 1G may be changed as described in any of the embodiments described above.

Figure 10:
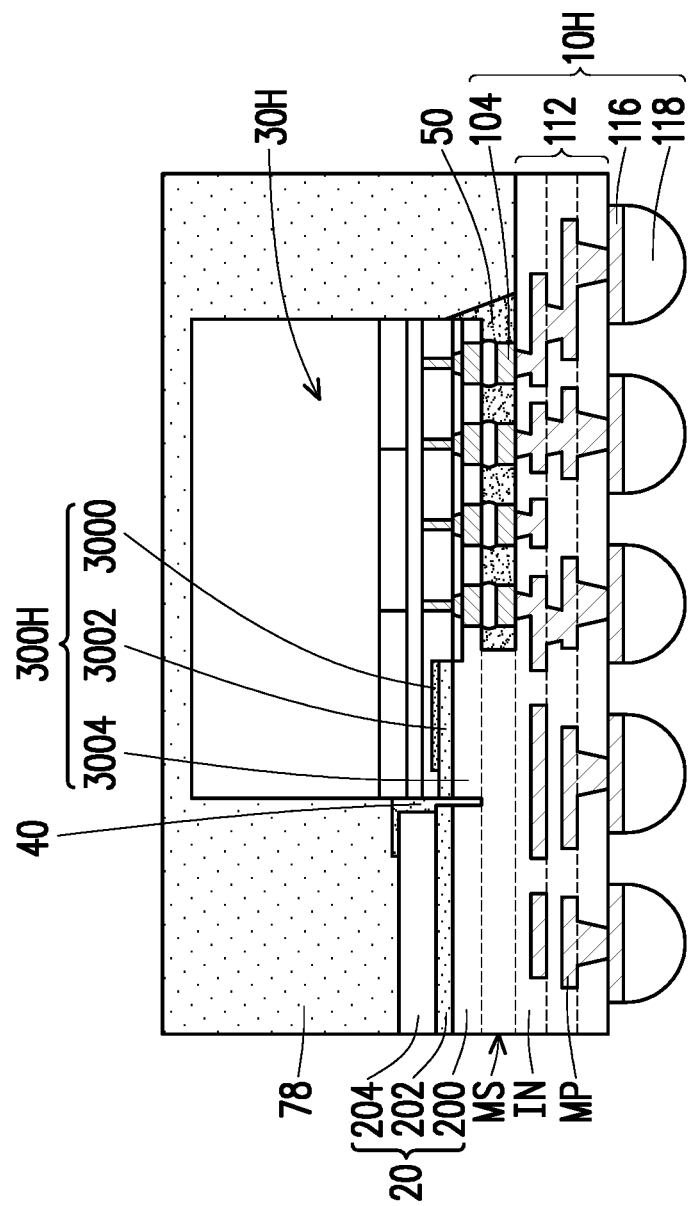
FIG. 10 schematically illustrates a semiconductor package in accordance with some embodiments of the disclosure.

FIG. 10 schematically illustrates a semiconductor package 1H in accordance with some embodiments of the disclosure. Referring to FIG. 10, the semiconductor package 1H may include a substrate 10H, the first waveguide 20, a semiconductor die 30H, the adhesive layer 40, the underfill 50, and the encapsulant 78.

In some embodiments, the substrate 10H includes the first redistribution structure 112, the under-bump metallizations 116, and the conductive connectors 118. In some embodiments, the substrate 10H further includes a mesa portion MS that supports the first waveguide 20 and a second waveguide 300H of the semiconductor die 30H and assists in alignment of the second waveguide 300H with the first waveguide 20. The mesa portion MS may be formed in a manner similar to the insulating layers IN, and may be formed of a similar material as the insulating layers IN.

In the semiconductor die 30H, the first die (not shown) and the second die (not shown) described above may be included, and the second waveguide 300H may be in the first die. In some embodiments, the second waveguide 300H includes the silicon waveguide 3000, the second polymer waveguide 3002, and the second bottom dielectric layer 3004, and the second bottom dielectric layer 3004 may be in contact with the mesa portion MS when the semiconductor die 30H is disposed on the substrate 10H.

In the semiconductor package 1H, the silicon waveguide 3000 is optically coupled to the first polymer waveguide 202 through the second polymer waveguide 3002 and the adhesive layer 40. By the design of the mesa portion MS, higher alignment accuracy and less alignment time can be achieved when aligning the second polymer waveguide 3002 with the first polymer waveguide 202. In addition, by integrating the first waveguide 20 into the semiconductor package 1H, tolerance in the first direction D1 and the second direction D2 can be improved in subsequent optical fiber assembly (e.g., an optical fiber can be disposed at the left-hand side of the first waveguide 20; not shown), and thus higher assembly accuracy and less assembly time can be achieved. Moreover, by making the refractive index design of the second polymer waveguide 3002 and the first bottom dielectric layer 200, the amount of light leaking from the second polymer waveguide 3002 can be reduced, and thus optical loss can be reduced.

FIG. 11A to FIG. 11I schematically illustrate cross-sectional views of a manufacturing process of the semiconductor package 1H in FIG. 10.

Referring to FIG. 11A, the first redistribution structure 112, the under-bump metallizations 116, and the conductive connectors 118 are sequentially formed on a carrier substrate C1. The carrier substrate C1 may be a glass carrier substrate, a ceramic carrier substrate, or the like. The carrier substrate C1 may be a wafer, such that multiple packages can be formed on the carrier substrate C1 simultaneously.

In some embodiments, a release layer (not shown) is formed on the carrier substrate C1 prior to the first redistribution structure 112. The release layer may be formed of a polymer-based material, which may be removed along with the carrier substrate C1 from the overlying structures that will be formed in subsequent steps. In some embodiments, the release layer is an epoxy-based thermal-release material, which loses its adhesive property when heated, such as a light-to-heat-conversion (LTHC) release coating. In other embodiments, the release layer may be an ultra-violet (UV) glue, which loses its adhesive property when exposed to UV lights. The release layer may be dispensed as a liquid and cured, may be a laminate film laminated onto the carrier substrate C1, or may be the like. The top surface of the release layer may be leveled and may have a high degree of planarity.

Referring to FIG. 11B, the first redistribution structure 112, the under-bump metallizations 116, and the conductive connectors 118 are transferred to a carrier substrate C2 using an adhesive layer AD1 formed over the conductive connectors 118. The adhesive layer AD1 may include any suitable adhesive, epoxy, DAF, or the like. The carrier substrate C2 may be a glass carrier substrate, a ceramic carrier substrate, or the like.

Figure 11C:
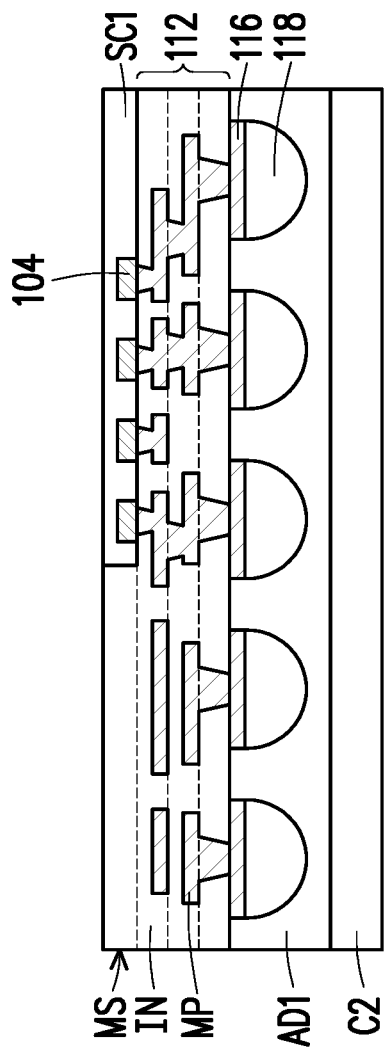

Referring to FIG. 11C, the mesa portion MS and the connectors 104 are formed on the first redistribution structure 112. Subsequently, a sacrificial layer SC1 is formed on the connectors 104 and on the first redistribution structure 112 that is exposed by the mesa portion MS. In some embodiments, the sacrificial layer SC1 includes polyimide, polyolefin, a combination thereof, or the like and may be formed using spin coating, or the like.

Figure 11D:
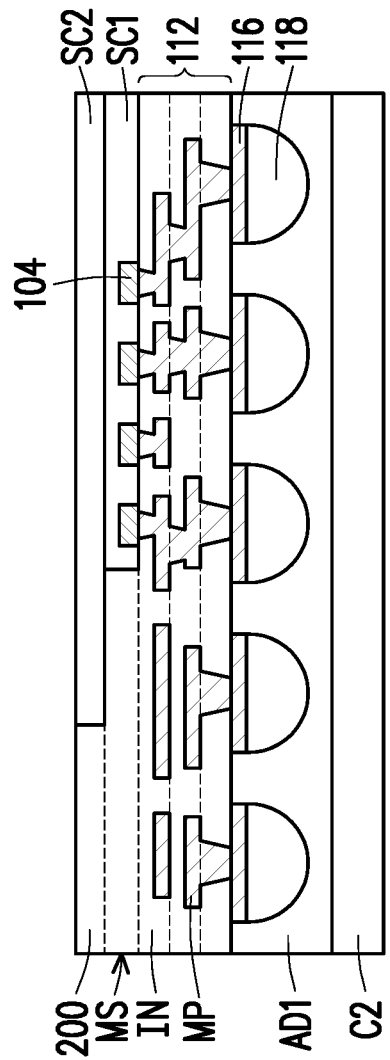

Referring to FIG. 11D, the first bottom dielectric layer 200 is formed on the mesa portion MS. Subsequently, a sacrificial layer SC2 is formed on the sacrificial layer SC1 and the mesa portion MS that is exposed by the first bottom dielectric layer 200. The sacrificial layer SC2 may be formed in a manner similar to the sacrificial layer SC1, and may be formed of a similar material as the sacrificial layer SC1.

Figure 11E:
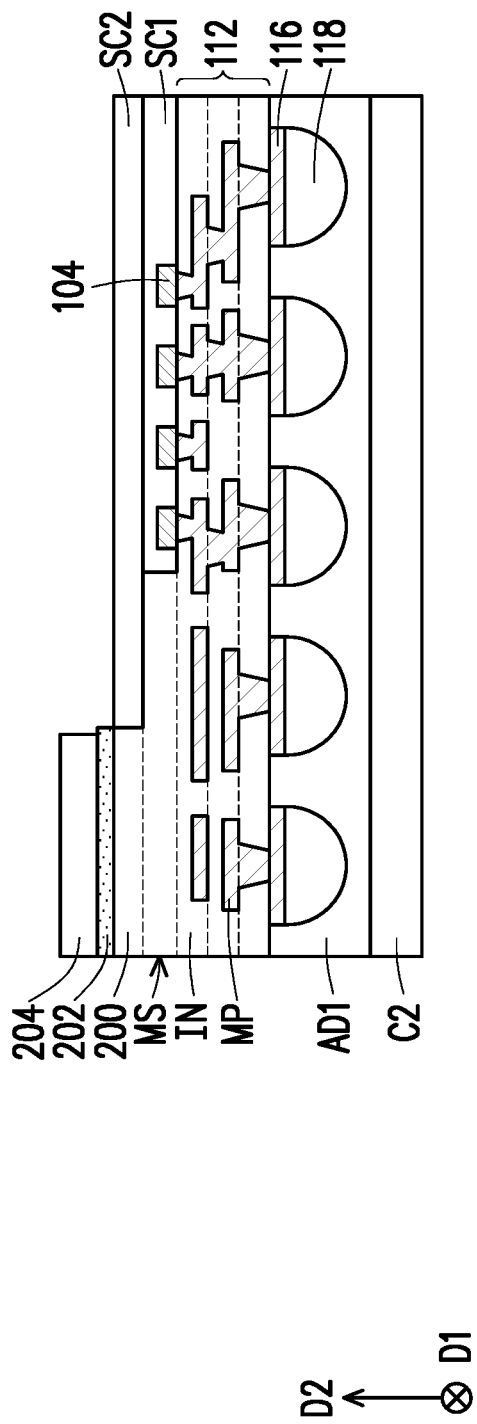
Figure 11F:
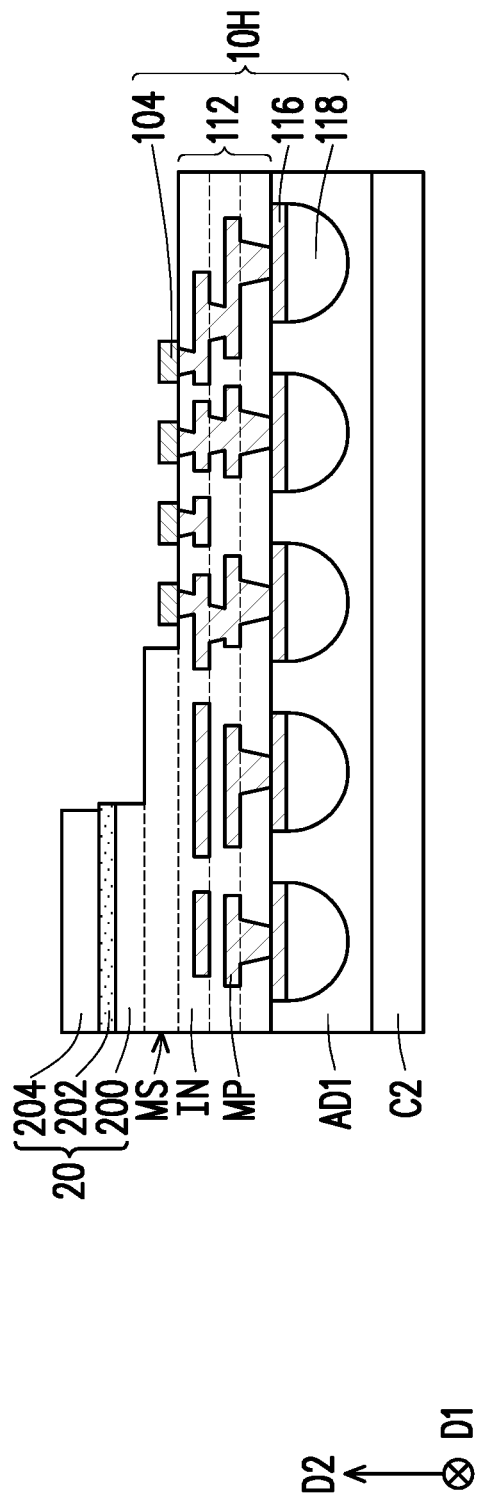

Referring to FIG. 11E, the first polymer waveguide 202 and the first top dielectric layer 204 are sequentially formed on the first bottom dielectric layer 200. Subsequently, as shown in FIG. 11F, the sacrificial layer SC1 and the sacrificial layer SC2 are removed to expose the connectors 104. In some embodiments, the sacrificial layer SC1 and the sacrificial layer SC2 are removed by a suitable selective etch process. The selective etch process may include one or more suitable wet etch processes, one or more suitable dry etch processes, combinations thereof, or the like. In some embodiments, the wet tech processes may be performed using suitable strippers. In some embodiments, the dry tech processes may be performed using gasses, such as $O_2$, Ar, a combination thereof, or the like.

Figure 11G:
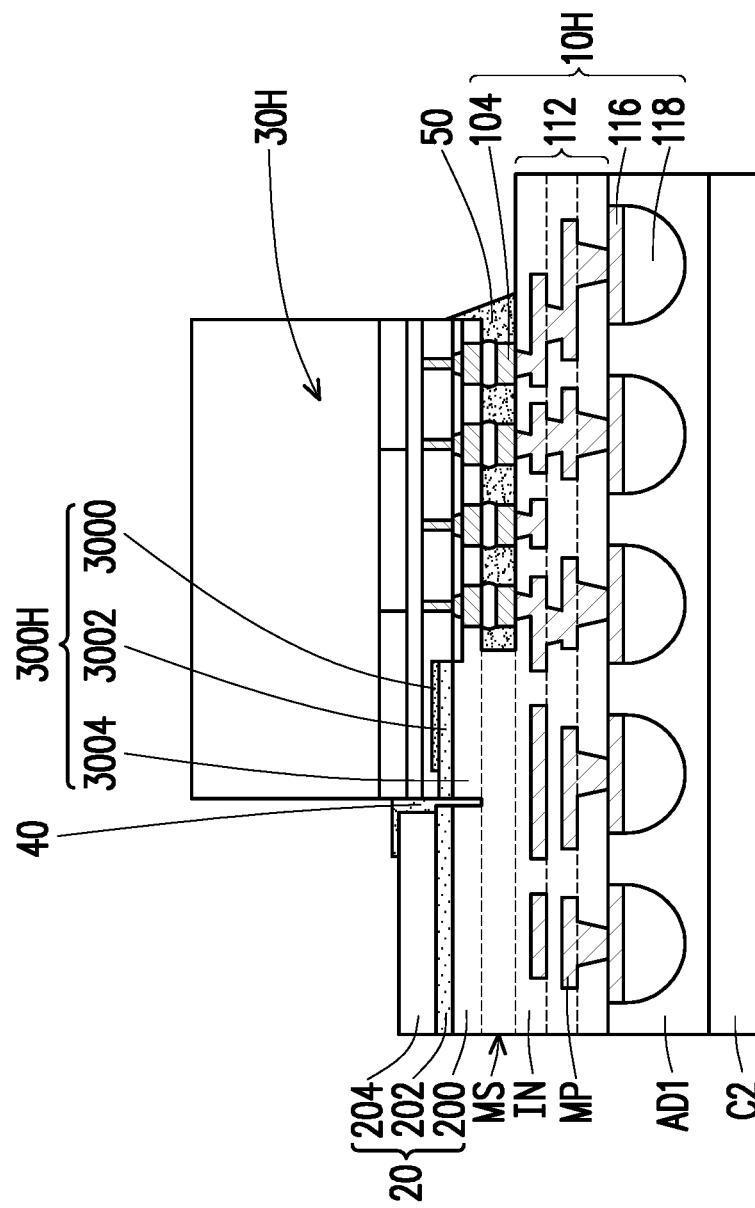
Figure 11H:
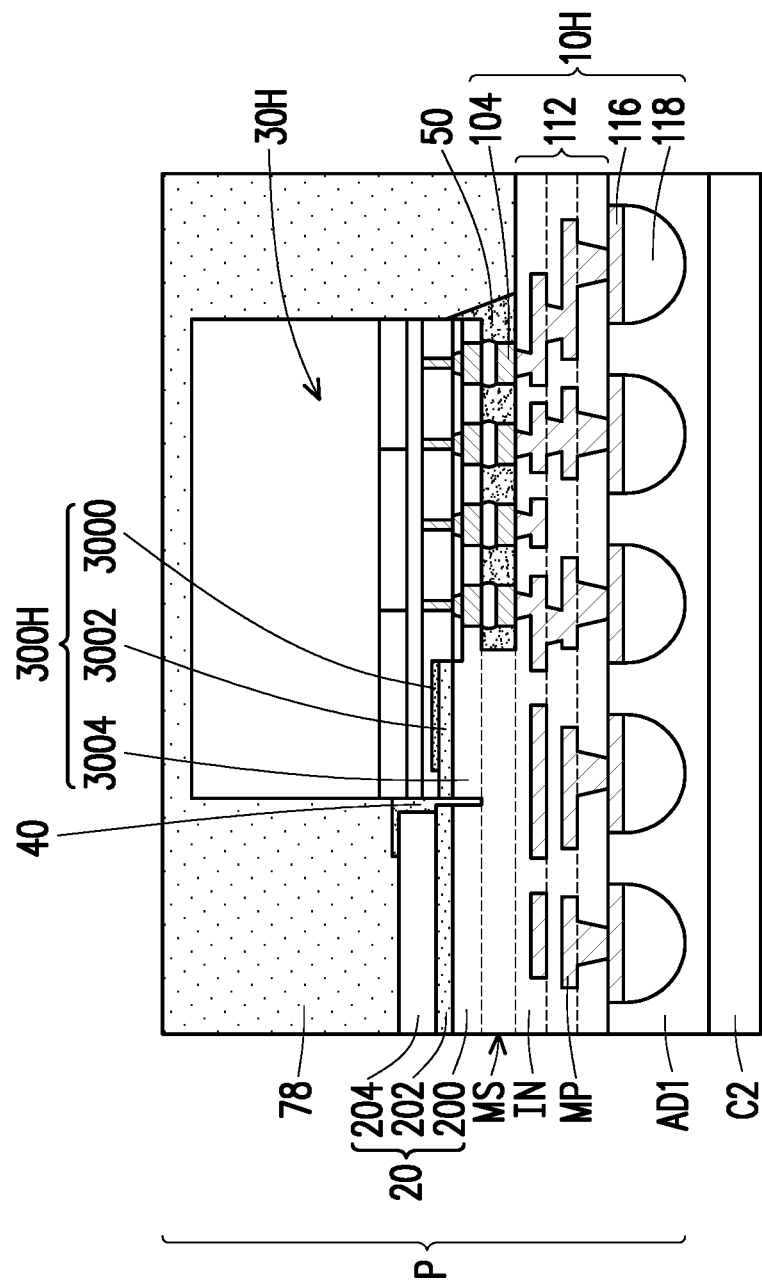

Referring to FIG. 11G, the semiconductor die 30H is bonded to the connectors 104. Subsequently, the adhesive layer 40 and the underfill 50 are formed. Referring to FIG. 11H, after the encapsulant 78 is formed, a package component P is preliminary completed. The package component P includes a plurality of package regions (one package region is schematically illustrated in FIG. 11H), and one or more of the integrated circuit dies are packaged to form an integrated circuit package in each of the package regions.

Figure 11I:
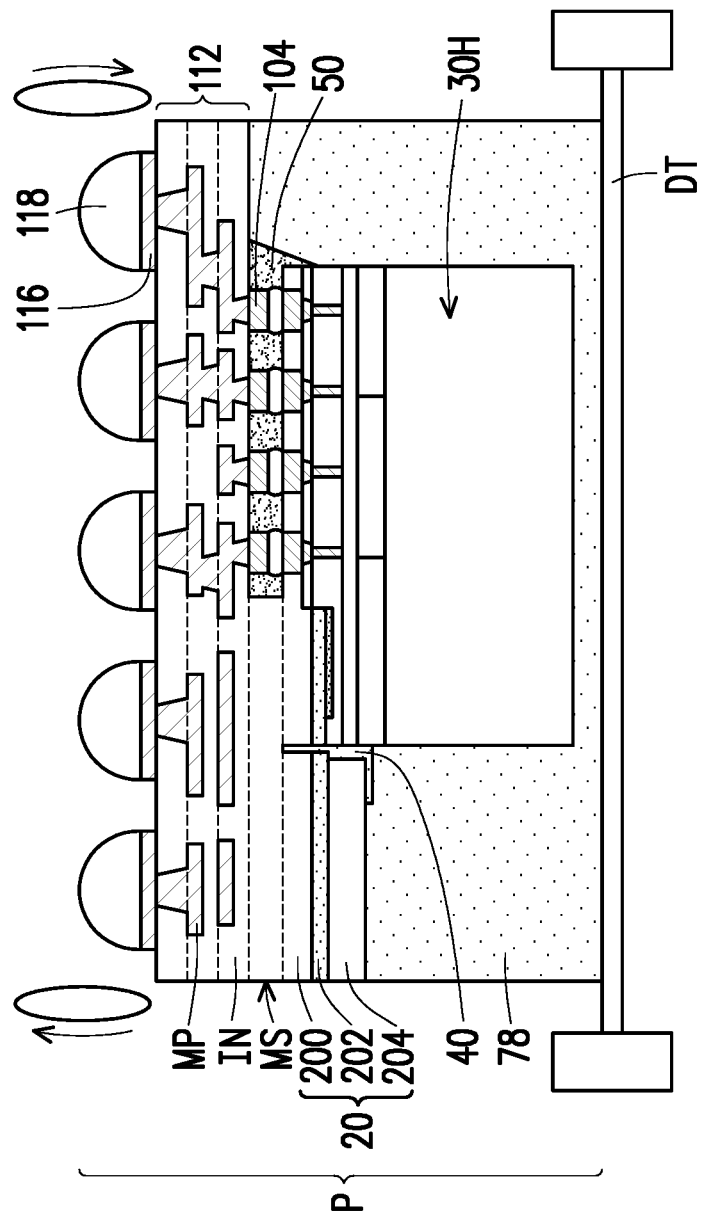

Referring to FIG. 11I, the package component P is flipped and is placed on a dicing tape DT. Subsequently, the carrier substrate C2 is de-bonded, and the adhesive layer AD1 is cleaned. Then, a singulation process is performed by sawing along scribe line regions, e.g., between adjacent package regions of the package component P. The sawing singulates the package region from the rest of the package component P and forms the semiconductor package 1H in FIG. 10.

FIG. 12A to FIG. 12J schematically illustrate cross-sectional views of another manufacturing process of the semiconductor package 1H in FIG. 10.

Figure 12A:
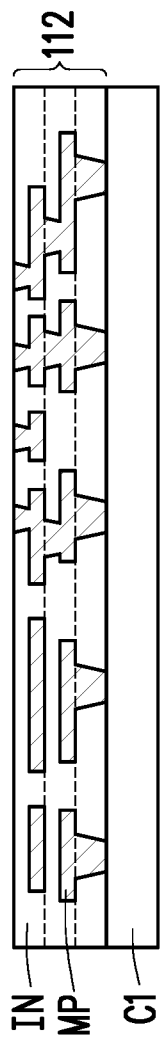
FIG. 12A to FIG. 12J schematically illustrate cross-sectional views of another manufacturing process of the semiconductor package in FIG. 10.
Figure 12B:
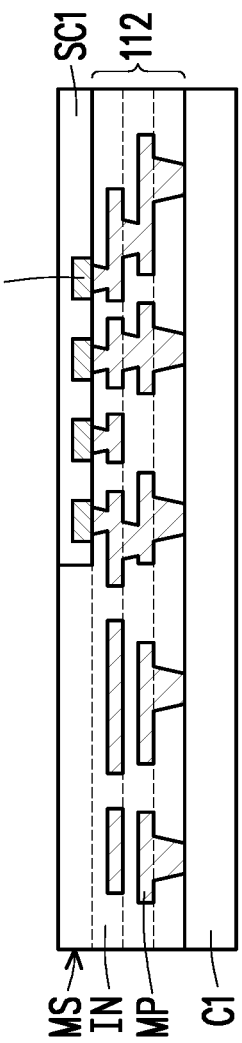

Referring to FIG. 12A to FIG. 12B, the first redistribution structure 112 is formed on the carrier substrate C1. In some embodiments, a release layer (not shown) is formed on the carrier substrate C1 prior to the first redistribution structure 112. Subsequently, the mesa portion MS and the connectors 104 are formed on the first redistribution structure 112. Then, the sacrificial layer SC1 is formed on the connectors 104 and on the first redistribution structure 112 that is exposed by the mesa portion MS.

Figure 12C:
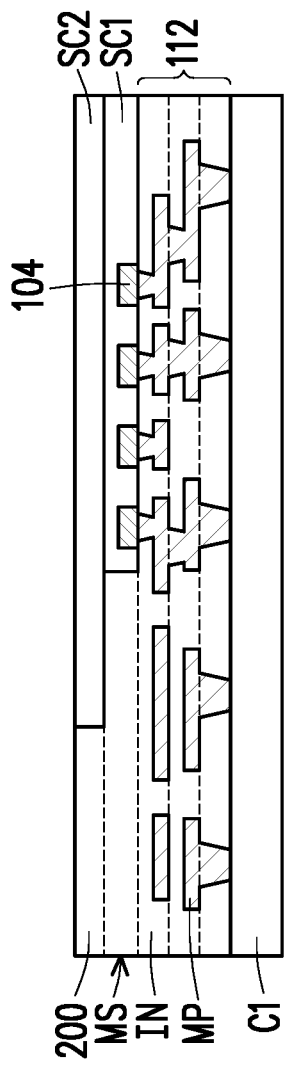
Figure 12D:
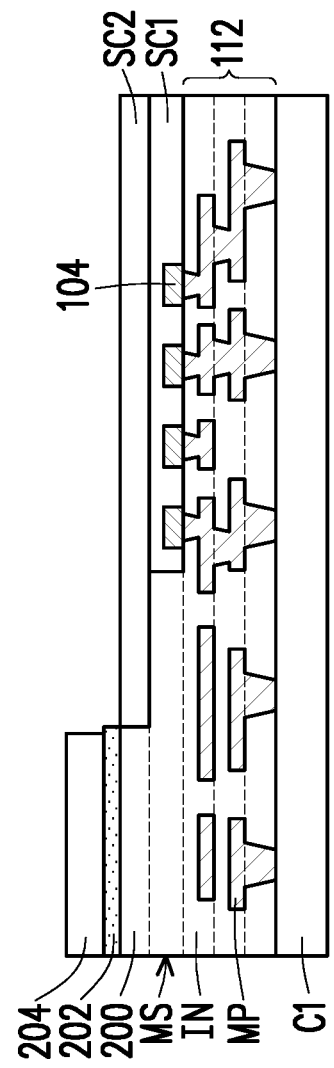

Referring to FIG. 12C and FIG. 12D, the first bottom dielectric layer 200 is formed on the mesa portion MS. Subsequently, a sacrificial layer SC2 is formed on the sacrificial layer SC1 and the mesa portion MS that is exposed by the first bottom dielectric layer 200. Then, the first polymer waveguide 202 and the first top dielectric layer 204 are sequentially formed on the first bottom dielectric layer 200.

Figure 12E:
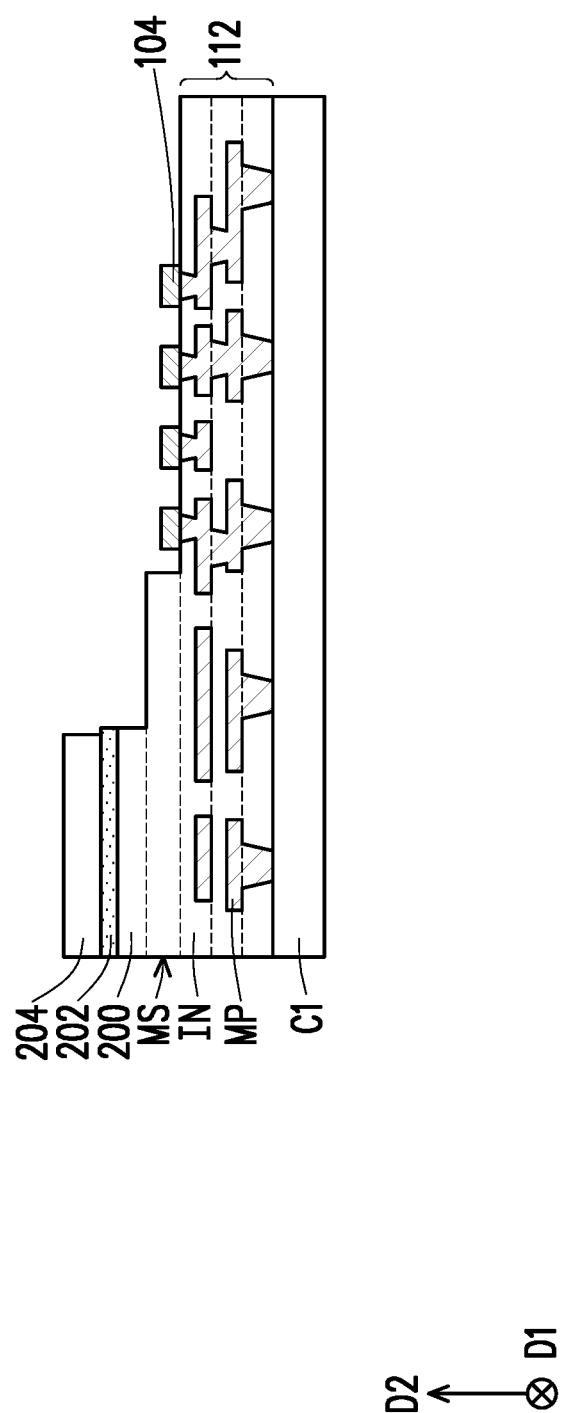
Figure 12F:
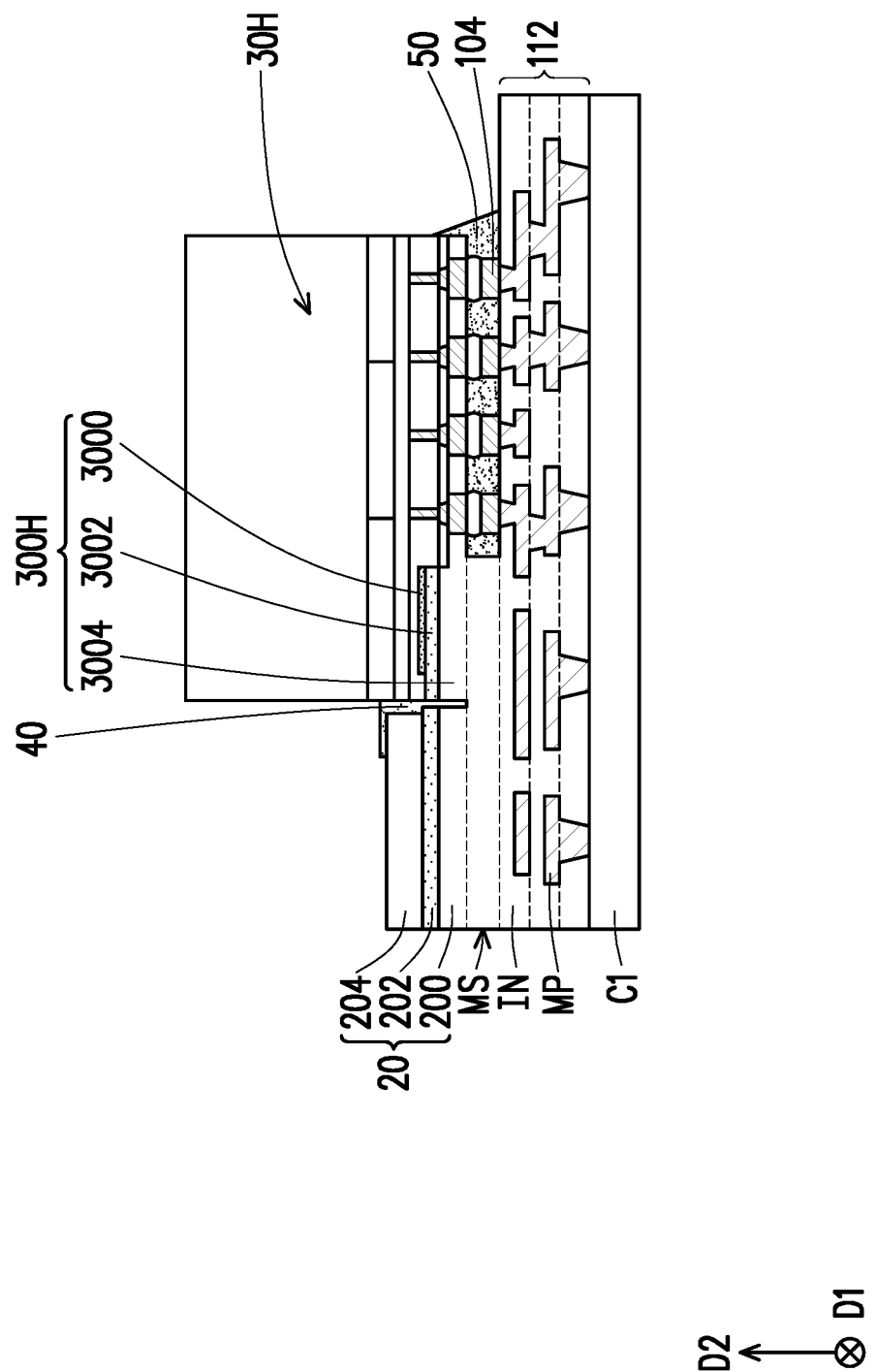

Referring to FIG. 12E to FIG. 12F, the sacrificial layer SC1 and the sacrificial layer SC2 are removed to expose the connectors 104. Subsequently, the semiconductor die 30H is bonded to the connectors 104. Then, the adhesive layer 40 and the underfill 50 are formed.

Figure 12G:
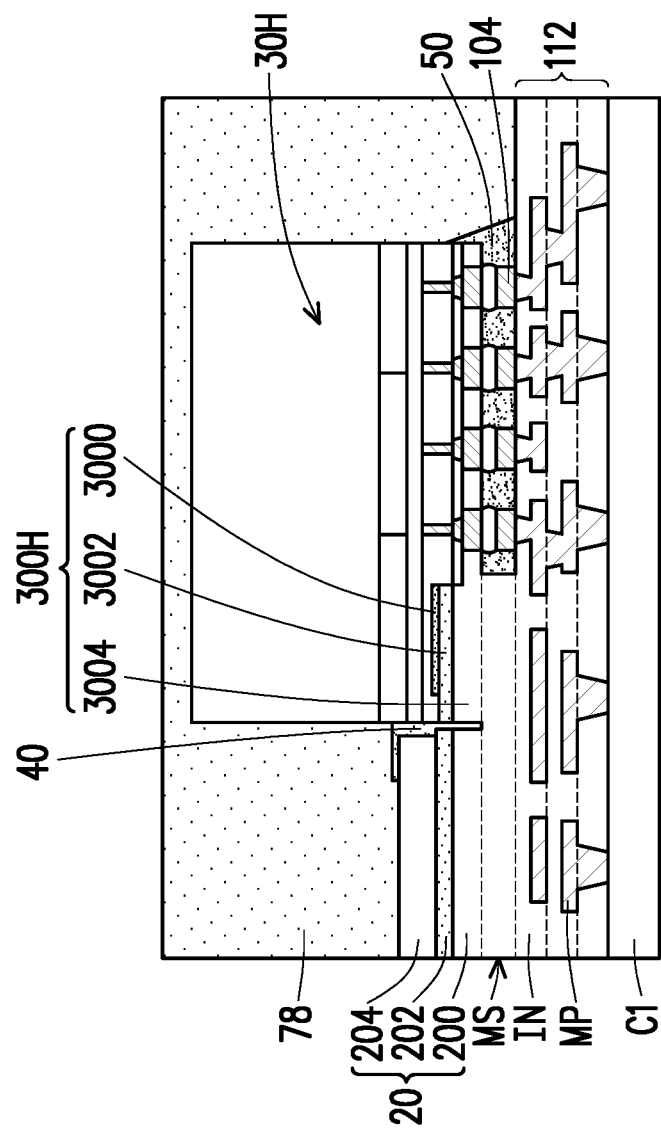
Figure 12H:
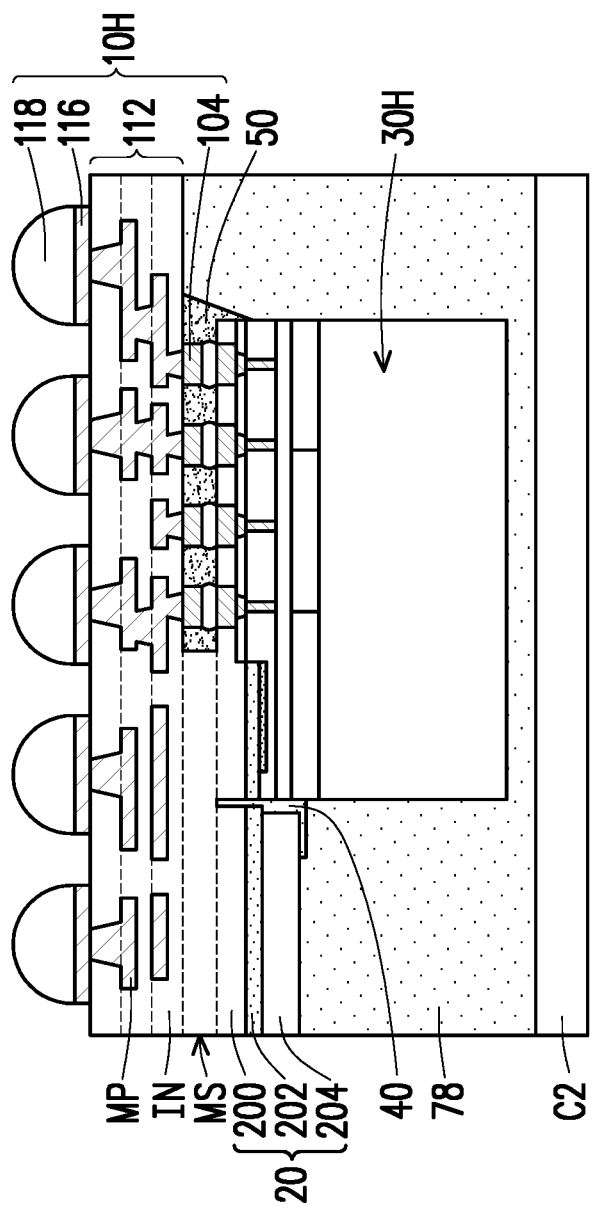

Referring to FIG. 12G to FIG. 12H, the encapsulant 78 is formed. Subsequently, the package in FIG. 12G is flipped and is placed on the carrier substrate C2. In some embodiments, a release layer (not shown) is formed between the carrier substrate C2 and the package in FIG. 12G. Then, the carrier substrate C1 is de-bonded. Afterwards, the under-bump metallizations 116 and the conductive connectors 118 are sequentially formed on the first redistribution structure 112.

Figure 12I:
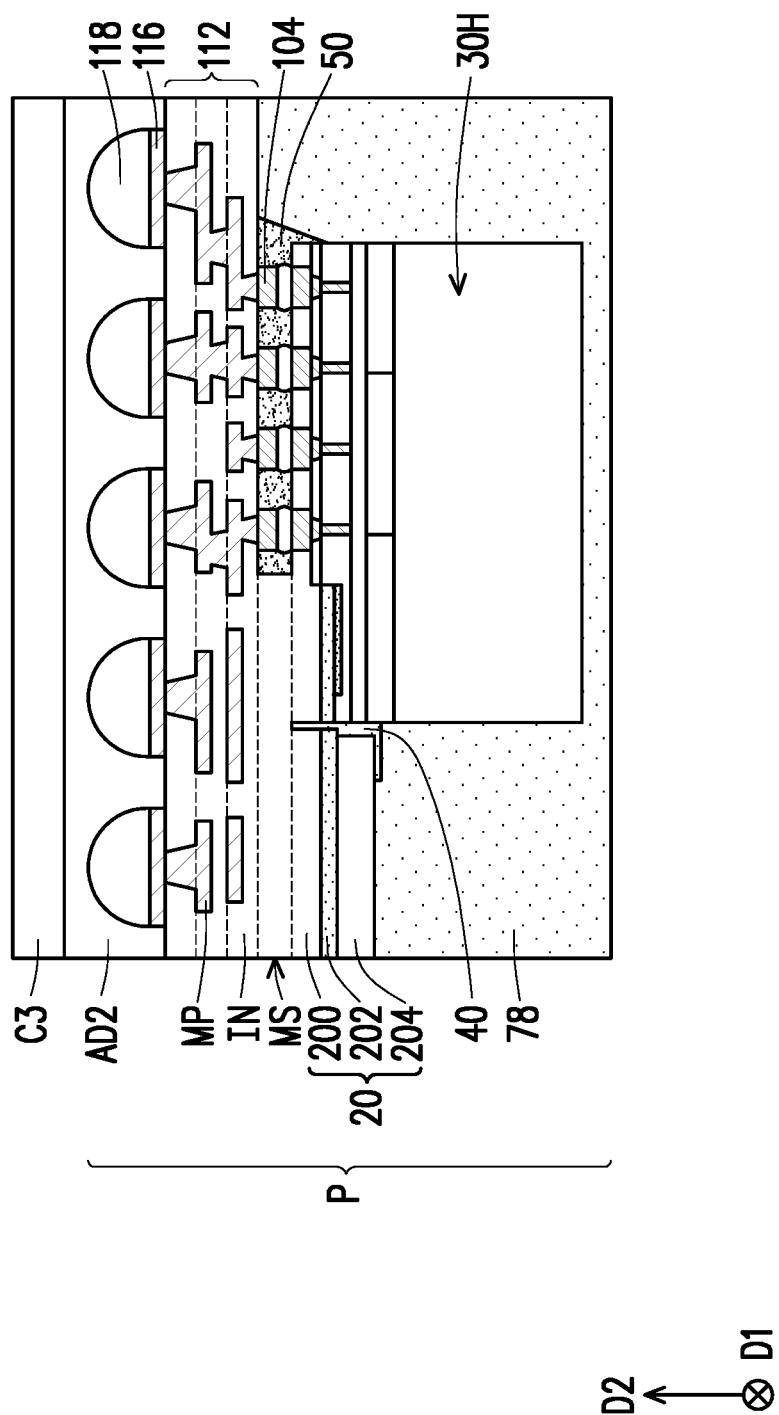

Referring to FIG. 12I, a carrier substrate C3 is formed over the conductive connectors 118 using an adhesive layer AD2. The adhesive layer AD2 may include any suitable adhesive, epoxy, DAF, or the like. The carrier substrate C3 may be a glass carrier substrate, a ceramic carrier substrate, or the like. Subsequently, the carrier substrate C2 is de-bonded.

Figure 12J:
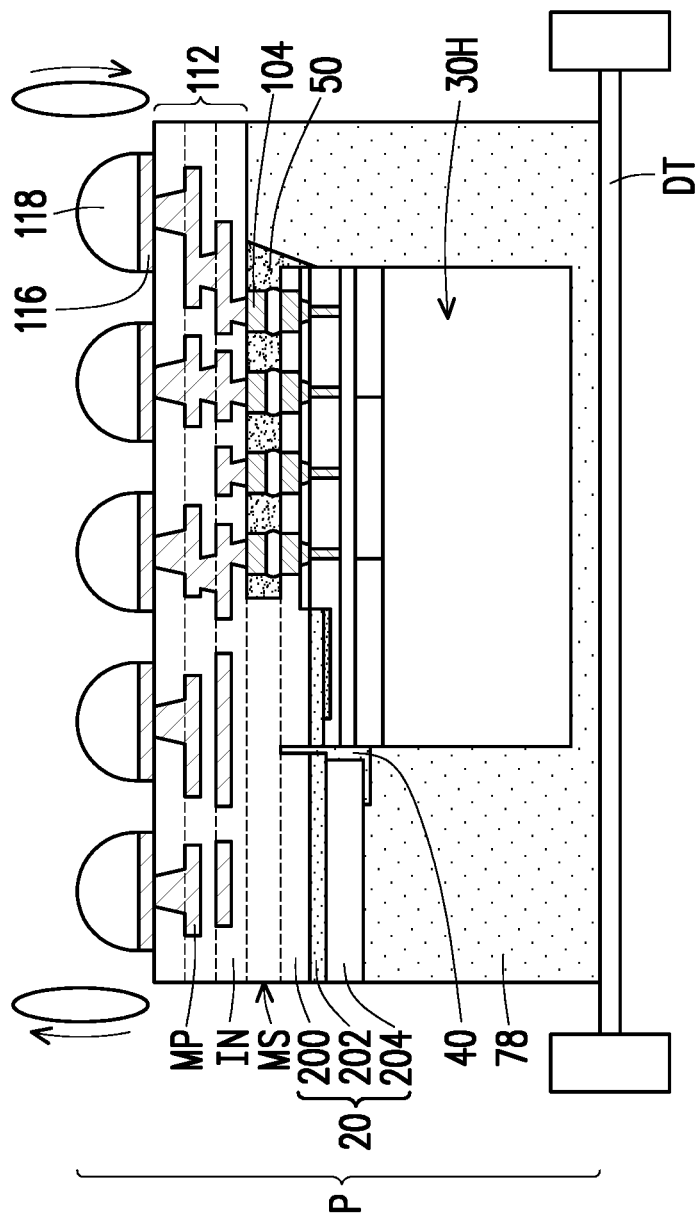

Referring to FIG. 12J, the package component P is flipped and is placed on the dicing tape DT. Subsequently, the carrier substrate C3 is de-bonded, and the adhesive layer AD2 is cleaned. Then, a singulation process is performed by sawing along scribe line regions, e.g., between adjacent package regions of the package component P. The sawing singulates the package region from the rest of the package component P and forms the semiconductor package 1H in FIG. 10.

Based on the above discussions, it can be seen that the present disclosure offers various advantages. It is understood, however, that not all advantages are necessarily discussed herein, and other embodiments may offer different advantages, and that no particular advantage is required for all embodiments.

In accordance with an embodiment, a semiconductor package includes: a substrate; a first waveguide disposed on the substrate; a semiconductor die disposed on the substrate and including a second waveguide aligned with the first waveguide; and an adhesive layer disposed between the first waveguide and the second waveguide. In an embodiment, the substrate includes a mesa portion that supports the first waveguide and the second waveguide and assists in alignment of the second waveguide with the first waveguide. In an embodiment, the first waveguide has a recessed portion that supports the second waveguide and assists in alignment of the second waveguide with the first waveguide. In an embodiment, the first waveguide includes a first bottom dielectric layer, a first polymer waveguide, and a first top dielectric layer sequentially stacked on the substrate, and the adhesive layer is in contact with at least one of the first bottom dielectric layer, the first polymer waveguide, and the first top dielectric layer. In an embodiment, a portion of the first polymer waveguide is exposed by the first top dielectric layer, the second waveguide includes a silicon waveguide disposed on the portion of the first polymer waveguide, and the silicon waveguide is optically coupled to the first polymer waveguide through the adhesive layer. In an embodiment, the second waveguide includes a silicon waveguide having a tip that ends at an edge of the semiconductor die and points to the first polymer waveguide. In an embodiment, the second waveguide includes a silicon waveguide, a second polymer waveguide, and a second bottom dielectric layer, wherein the second polymer waveguide is disposed between the silicon waveguide and the second bottom dielectric layer and aligned with the first polymer waveguide. In an embodiment, the second waveguide further includes a second top dielectric layer disposed on the second polymer waveguide, between the silicon waveguide and the first top dielectric layer, and adjacent to an edge of the semiconductor die. In an embodiment, a portion of the first bottom dielectric layer is exposed by the first polymer waveguide, the second waveguide includes a silicon waveguide and a second polymer waveguide disposed between the silicon waveguide and the portion of the first bottom dielectric layer, and the second polymer waveguide is aligned with the first polymer waveguide. In an embodiment, the second waveguide further includes a second top dielectric layer disposed on the second polymer waveguide, between the silicon waveguide and the first top dielectric layer, and adjacent to an edge of the semiconductor die. In an embodiment, the second waveguide further includes a second bottom dielectric layer disposed between the second polymer waveguide and the portion of the first bottom dielectric layer. In an embodiment, the semiconductor die further includes a first die and a second die electrically connected to the first die, and the second waveguide is in the first die. In an embodiment, the semiconductor package further includes an optical fiber disposed on the substrate and optically coupled to the second waveguide through the first waveguide.

In accordance with another embodiment, a semiconductor package includes: a substrate; a first polymer waveguide disposed on the substrate; a semiconductor die disposed on the substrate and comprising a silicon waveguide; and an adhesive layer disposed between the first polymer waveguide and the silicon waveguide, wherein the first polymer waveguide and the silicon waveguide are optically coupled by the adhesive layer. In an embodiment, a portion of the first polymer waveguide is disposed between the silicon waveguide and the substrate. In an embodiment, the silicon waveguide has a tip that ends at an edge of the semiconductor die and aligns the first polymer waveguide. In an embodiment, the semiconductor die further includes a second polymer waveguide disposed between the silicon waveguide and the substrate and aligned with the first polymer waveguide. In an embodiment, the second waveguide further includes a second top dielectric layer disposed on the second polymer waveguide and adjacent to an edge of the semiconductor die.

In accordance with yet another embodiment, a manufacturing method of a semiconductor package includes: forming a first waveguide on a substrate; forming a semiconductor die on the substrate, wherein the semiconductor die comprises a second waveguide aligned with the first waveguide; and disposing an adhesive layer between the first waveguide and the second waveguide. In an embodiment, forming the semiconductor die on the substrate is subsequent to forming the first waveguide on the substrate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor package, comprising:
a substrate;
a first waveguide disposed on the substrate;
a semiconductor die disposed on the substrate and comprising a second waveguide aligned with the first waveguide; and
an adhesive layer disposed between the first waveguide and the second waveguide, wherein the first waveguide comprises a first bottom dielectric layer, a first polymer waveguide, and a first top dielectric layer sequentially stacked on the substrate, and the adhesive layer is in contact with at least one of the first bottom dielectric layer, the first polymer waveguide, and the first top dielectric layer.

2. The semiconductor package as claimed in claim 1, wherein the substrate comprises a mesa portion that supports the first waveguide and the second waveguide and assists in alignment of the second waveguide with the first waveguide.

3. The semiconductor package as claimed in claim 1, wherein the first waveguide has a recessed portion that supports the second waveguide and assists in alignment of the second waveguide with the first waveguide.

4. The semiconductor package as claimed in claim 1, wherein a portion of the first polymer waveguide is exposed by the first top dielectric layer, the second waveguide comprises a silicon waveguide disposed on the portion of the first polymer waveguide, and the silicon waveguide is optically coupled to the first polymer waveguide through the adhesive layer.

5. The semiconductor package as claimed in claim 1, wherein the second waveguide comprises a silicon waveguide having a tip that ends at an edge of the semiconductor die and points to the first polymer waveguide.

6. The semiconductor package as claimed in claim 1, wherein the second waveguide comprises a silicon waveguide, a second polymer waveguide, and a second bottom dielectric layer, wherein the second polymer waveguide is disposed between the silicon waveguide and the second bottom dielectric layer and aligned with the first polymer waveguide.

7. The semiconductor package as claimed in claim 6, wherein the second waveguide further comprises a second top dielectric layer disposed on the second polymer waveguide, between the silicon waveguide and the first top dielectric layer, and adjacent to an edge of the semiconductor die.

8. The semiconductor package as claimed in claim 1, wherein a portion of the first bottom dielectric layer is exposed by the first polymer waveguide, the second waveguide comprises a silicon waveguide and a second polymer waveguide disposed between the silicon waveguide and the portion of the first bottom dielectric layer, and the second polymer waveguide is aligned with the first polymer waveguide.

9. The semiconductor package as claimed in claim 8, wherein the second waveguide further comprises a second top dielectric layer disposed on the second polymer waveguide, between the silicon waveguide and the first top dielectric layer, and adjacent to an edge of the semiconductor die.

10. The semiconductor package as claimed in claim 9, wherein the second waveguide further comprises a second bottom dielectric layer disposed between the second polymer waveguide and the portion of the first bottom dielectric layer.

11. The semiconductor package as claimed in claim 1, wherein the semiconductor die further comprises a first die and a second die electrically connected to the first die, and the second waveguide is in the first die.

12. The semiconductor package as claimed in claim 1, further comprising:

an optical fiber disposed on the substrate and optically coupled to the second waveguide through the first waveguide.

13. A semiconductor package, comprising:
a substrate;
a first polymer waveguide disposed on the substrate;
a semiconductor die disposed on the substrate and comprising a silicon waveguide; and
an adhesive layer disposed between the first polymer waveguide and the silicon waveguide, wherein the first polymer waveguide and the silicon waveguide are optically coupled by the adhesive layer.

14. The semiconductor package as claimed in claim 13, wherein a portion of the first polymer waveguide is disposed between the silicon waveguide and the substrate.

15. The semiconductor package as claimed in claim 13, wherein the silicon waveguide has a tip that ends at an edge of the semiconductor die and aligns the first polymer waveguide.

16. The semiconductor package as claimed in claim 13, wherein the semiconductor die further comprises a second polymer waveguide disposed between the silicon waveguide and the substrate and aligned with the first polymer waveguide.

17. The semiconductor package as claimed in claim 16, wherein the second waveguide further comprises a second top dielectric layer disposed on the second polymer waveguide and adjacent to an edge of the semiconductor die.

18. A semiconductor package, comprising:
a substrate;
a first waveguide disposed on the substrate;
a first semiconductor die disposed on the substrate and comprising a second waveguide aligned with the first waveguide;
a second semiconductor die electrically connected to the first semiconductor die; and
an adhesive layer disposed between the first waveguide and the second waveguide.

19. The semiconductor package as claimed in claim 18, wherein the first waveguide comprises a first bottom dielectric layer, a first polymer waveguide, and a first top dielectric layer sequentially stacked on the substrate, and the adhesive layer is in contact with at least one of the first bottom dielectric layer, the first polymer waveguide, and the first top dielectric layer.

20. The semiconductor package as claimed in claim 18, wherein the second waveguide comprises a silicon waveguide.

* * * * *